(12) United States Patent
Nakamura et al.

(10) Patent No.: US 6,637,652 B2
(45) Date of Patent: Oct. 28, 2003

(54) IC CARD HANDLING DEVICE

(75) Inventors: Katsushi Nakamura, Ebina (JP); Nobuhiro Iguchi, Tokyo (JP); Osamu Fujimoto, Machida (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 10/089,898

(22) PCT Filed: Jul. 19, 2001

(86) PCT No.: PCT/JP01/06303

§ 371 (c)(1),
(2), (4) Date: Apr. 5, 2002

(87) PCT Pub. No.: WO02/19253

PCT Pub. Date: Jul. 19, 2001

(65) Prior Publication Data

US 2002/0153420 A1 Oct. 24, 2002

(30) Foreign Application Priority Data

Aug. 31, 2000 (JP) .......................... 2000-263081
Aug. 31, 2000 (JP) .......................... 2000-263082
Aug. 31, 2000 (JP) .......................... 2000-263083

(51) Int. Cl.[7] ................................................ G06K 7/06
(52) U.S. Cl. ........................................ 235/441; 235/451
(58) Field of Search ................................. 235/441, 451

(56) References Cited

U.S. PATENT DOCUMENTS 5,949,048 A * 9/1999 Nakamura et al. ........... 235/492
6,267,295 B1   7/2001 Amagai et al.

FOREIGN PATENT DOCUMENTS

| JP | 3-66708 B2 | 10/1991 |
| JP | 9-035020 A | 2/1997 |
| JP | 11-204203 A | 7/1999 |

* cited by examiner

*Primary Examiner*—Harold I. Pitts
(74) *Attorney, Agent, or Firm*—Frishauf, Holtz, Goodman & Chick, P.C.

(57) ABSTRACT

A card slot defines a space for receiving an IC card. A contact block has a plurality of contacts on one surface for contacting a plurality of contact points, respectively which are provided on one surface side of the IC cared received inside the card slot. A supporting mechanism movably supports the contact block in the vertical direction to the one surface of the IC card received inside the card slot, swingingly around a first axis line which passes through the center of the plurality of contacts of the contact block in the inserting direction of the IC card, and swingingly around a second axis line which passes through the center of the plurality of contacts of the contact block in the inserting direction of the IC card. An elastic member abuts against the contact block at one point only and applies a force to press the plurality of contacts of the contact block against one surface side of the IC card. A point of the place to which the pressing force is applied by the elastic member exists on an axis line which passes a cross point between the first axis line and the second axis line and extends vertically.

7 Claims, 35 Drawing Sheets

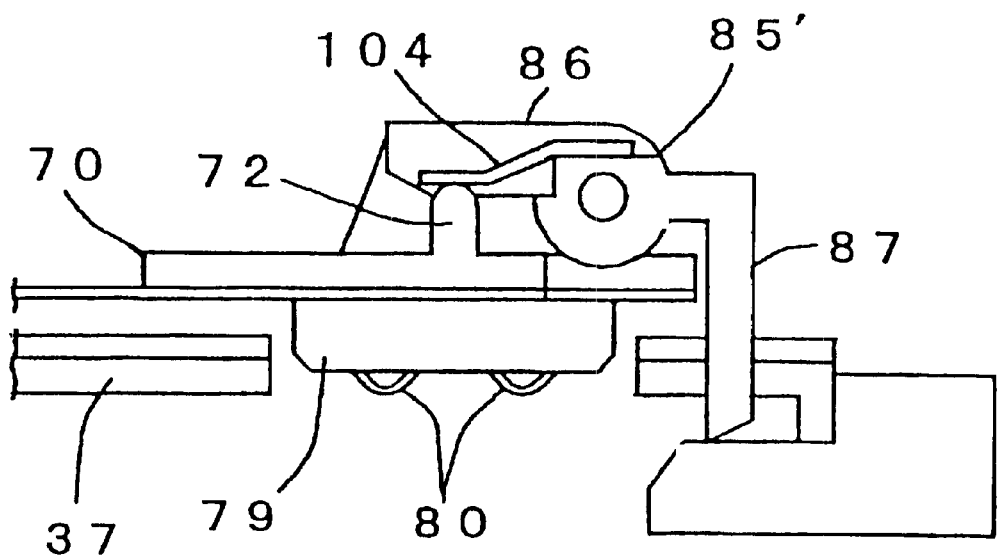
F I G. 22
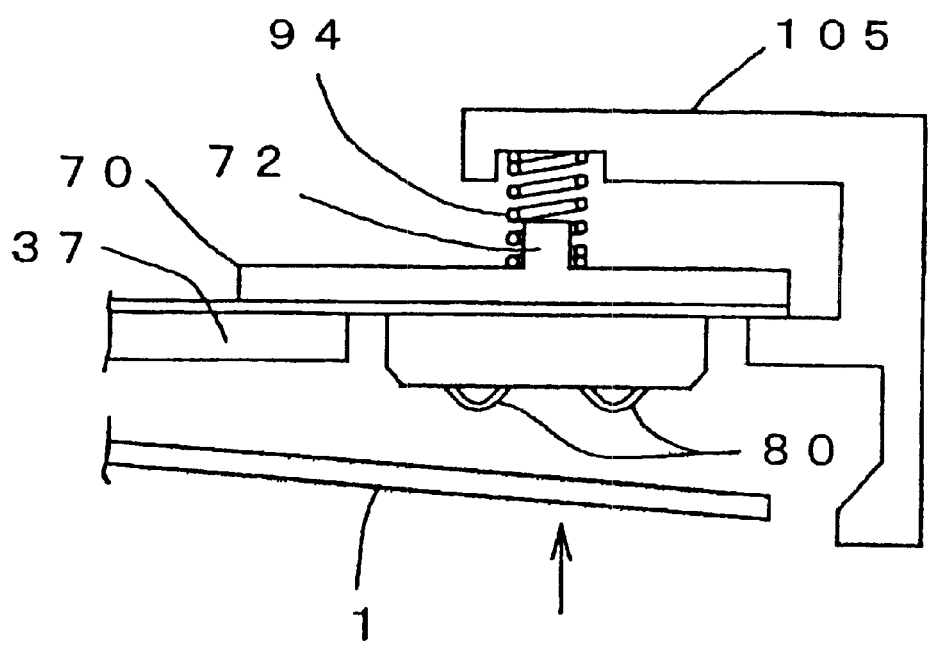
F I G. 23

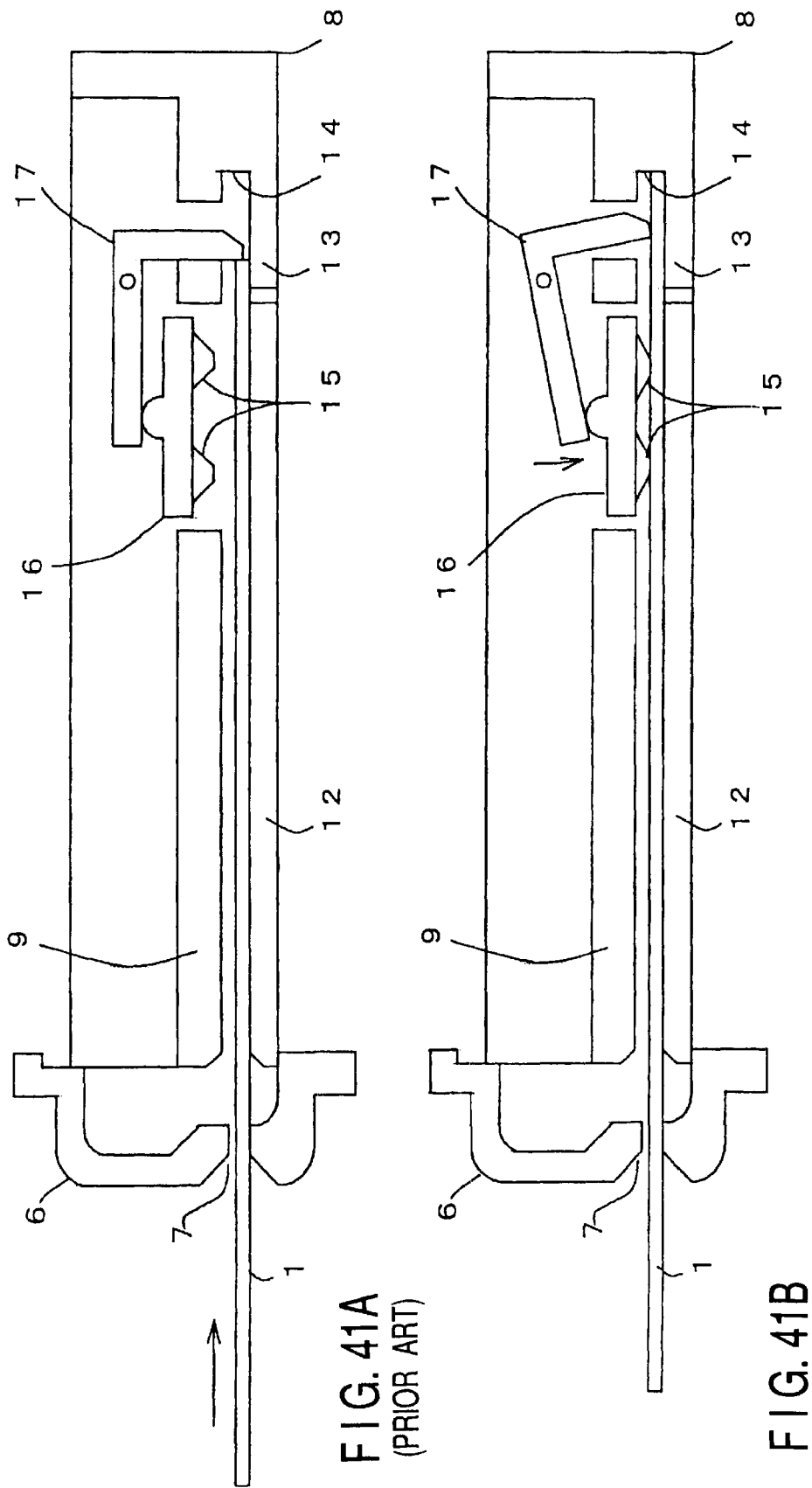

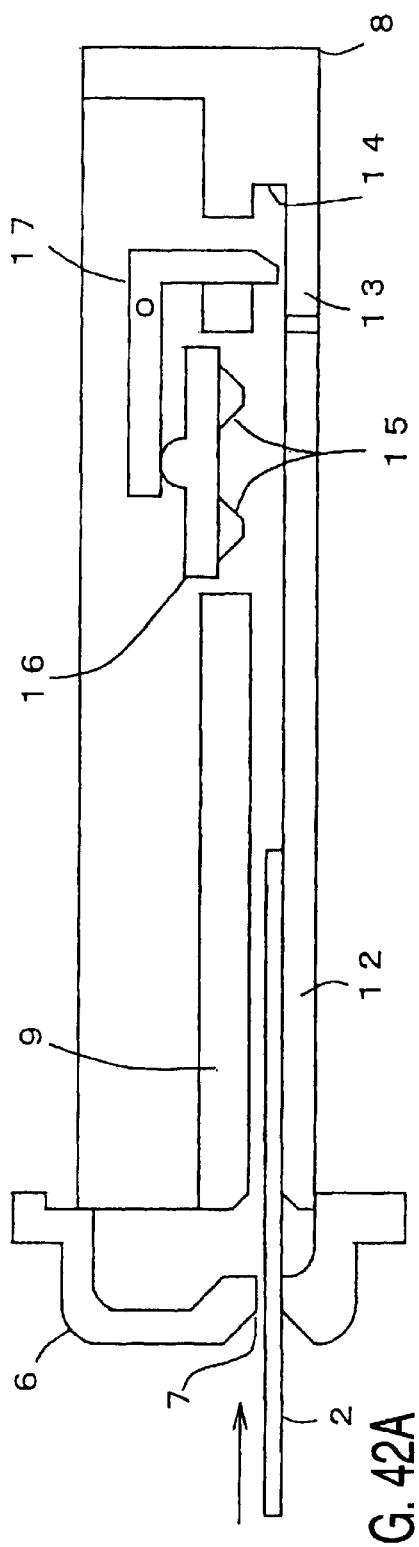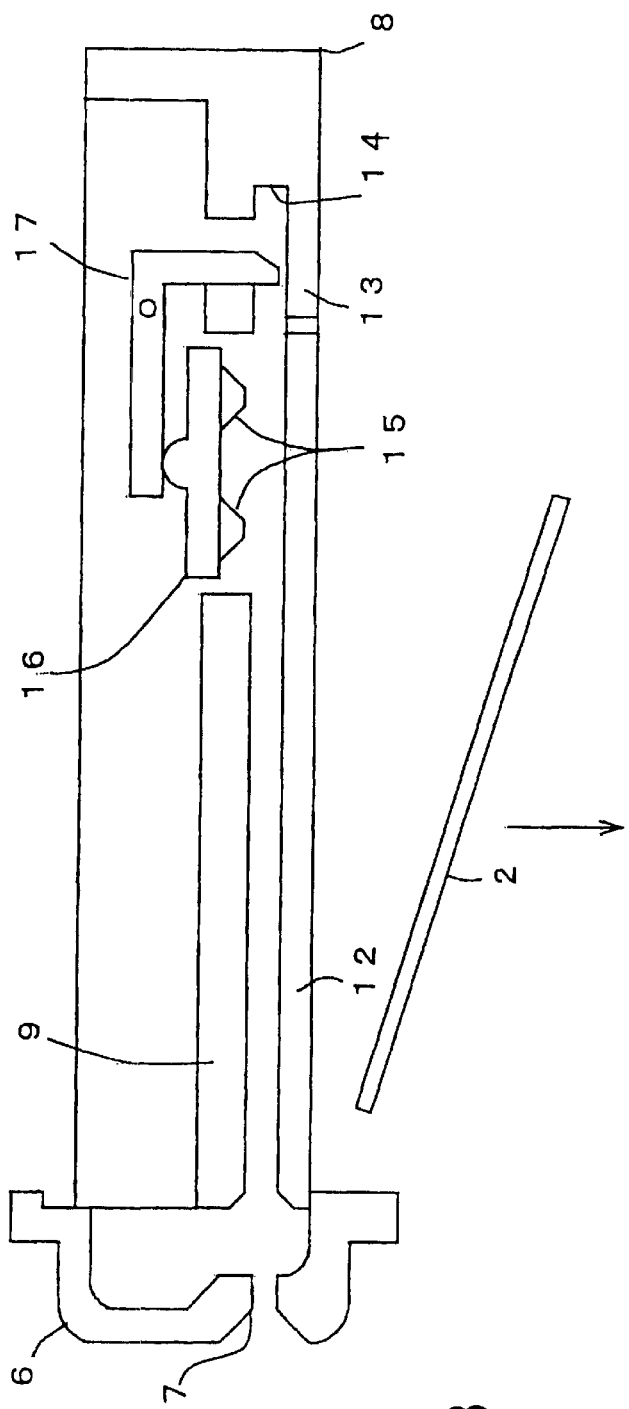
FIG. 42A (PRIOR ART)
FIG. 42B (PRIOR ART)

IC CARD HANDLING DEVICE

This application is a U.S. National Phase Application under 35 USC 371 of International Application PCT/JP01/06303(not published in English) filed Jul. 19, 2001.

TECHNICAL FIELD

The present invention relates to an IC card processor, and in particular, to an IC card processor having a contact block provided with a plurality of contacts on one surface side and allowing each contact of the contact block to contact each contact point of one surface side of an IC card received to a predetermined position so as to perform the giving/receiving of signals to/from the IC card, which adopts a technology that prevents damage of the contact due to insertion of an illegal card-like foreign matter.

Further, the present invention relates to an IC card processor, and in particular to an IC card processor allowing each contact to contact each contact point of one surface side of an IC card received to a predetermined position so as to perform the giving/receiving of signals to/from the IC card, which adopts a technology that can easily eliminate a short card-like foreign matter existing inside.

BACKGROUND ART

Conventionally, an IC card processor performing read/write of information for an IC card has been constituted in such a manner that contacts are respectively brought into contact with a plurality of contact points provided on one surface side of the IC card received to a predetermined position and communications have been made with a circuit inside the IC card by electrical connection between each contact point and the contact.

Such an IC card processor does not make the contact deformed by being pushed by the top end of the IC card to be inserted, and in order to make a life of the contact longer, it allows the contact to relatively move on one surface side of the IC card after the top end of the IC card passes through the position of the contact and allows the contact to be brought into contact with each contact point of the IC card.

Here, for example, when the contact side is moved to the IC card side, as shown in FIG. 33A, a contact block 212 provided with a plurality of contacts 211 on one surface side is fixedly supported on one end side of a movable member 213 of a rotatable type, and the other end side of the movable member 213 is pushed down by the inserting force of an IC card 201, and as shown in FIG. 33B, the contact block 212 at one end side is moved to one surface side of the IC card 201 so that the contact 211 is brought into contact with a contact point (not shown) of the IC card 201.

Incidentally, each contact 211 is elastically deformed so as to apply an adequate contact pressure to the contact point.

However, in a structure where each contact 211 of the contact block 212 fixedly supported on one end side of the movable member 213 is brought into contact with the IC card 201 in this way, when an IC card 201' having a warp is inserted as shown in FIG. 33C, the contact pressure of the contact 211 to each contact point of the IC card 201' becomes uneven and the like, and when the warp is larger, a part of the contact 211 sometimes does not contact the contact point.

In order to solve this problem, the present international patent applicant has proposed an IC card processor wherein the attitude of the contact block changes according to the warp of the IC card 201 by swingingly supporting the contact block 212 as shown in FIG. 34A in the previous International application No. PCT/JP98/00035 (International publication No. WO 99/35609).

By swingingly supporting the contact block 212 in this way, even when the IC card having a warp is inserted, the contact block 212 inclines by itself according to the warp and each contact 211 can be brought into contact with each contact point on the IC card by a substantially uniform contact pressure.

However, even in the IC card processor which swingingly supports the contact block 212 as described above, for example, when a regular IC card 201 is inserted, while a card-like foreign matter 202 having a length shorter than a regular length is inserted into the inside and remains there in a descending state as shown in FIG. 34B, the top end of the IC card 201 inserted thereafter abuts against the contact 211 of the contact block 212.

At this time, the contact block 212 is pushed to one end side of the movable member 213 and is unable to move upward, and the inserting force of the IC card 201 is directly applied on the contact 211 so that the contact 211 is sometimes damaged.

In order to solve this problem, it is considered to increase the strength (rigidity) of the contact 211. However, when the strength of the contact 211 is simply increased in this way, an elastic deformation amount is decreased, and an attitude adjustment range by the elastic deformation of the contact 211 is narrowed so as not to be able to deal with the warp of the IC card.

Further, in the previous International application No. PCT/JP98/00035 (International publication No. WO 99/35609), there has been disclosed a modified example, wherein the space between the movable member 213 and the contact block 212 is connected via a reverse V-shaped plate spring 218, and both ends of the plate spring 218 are allowed to slide on the upper surface of the contact block 211 so as to slidably support the contact black 211.

That is, in this modified example, it is considered to utilize the elastic deformation of the plate spring 218 so as to allow the contact block 212 to escape upward with respect to the IC card inserted which is in a state of the foreign matter 202 being inserted.

However, in order to apply an adequate contact pressure to the contact point of the regular IC card 201 usually by supporting the contact block 212 by the reverse V-shaped plate spring 218 in this way, and to allow the contact block 212 to escape from the IC card 201 inserted in a state of the foreign matter being present in the inner part, it is necessary to increase the elastic deformation amount of the plate spring 218.

In order to increase the elastic deformation amount of this plate spring 218, it is necessary to lengthen two sides of the plate spring 218, which ends up in moving a supporting point of the swinging away from the contact block 212.

For this reason, when the IC card 201 having a large warp is inserted, a dislocation between the contact point of the IC card 201 and the contact is increased and the contact relation between both of them becomes unstable so that the giving/receiving of the information can not be reliably performed.

Further, since a uniform load is not applied on each terminal of the contact point group, there arises a trouble that each terminal is one-sidedly worn.

On the other hand, such an IC card processor is often used in the equipment such a public telephone used by an unspecified person, and frequently suffers damage from mischief such as insertion of a foreign matter.

For this reason, the conventional IC card processor has the under surface side of the portion where the IC card is inserted largely opened so as to discharge and drop the inserted foreign matter downward.

FIGS. 36 to 40 show a schematic structure of a conventional IC card processor 5, which is constituted to discharge and drop the inserted foreign matter.

This IC card processor 5 receives the IC card inserted from a slit 7 which is laterally provided on the front surface side of a card slot 6 at the under surface side of a rectangular substrate 9 of a processor main body 8.

Here, at both sides of the under surface of the substrate 9, a pair of regulating portions 10, 11 to regulate a lateral movement of the inserted IC card from both sides are formed in such a manner as to continue from the front end to the vicinity of the rear end of the substrate 9.

At the lower edge of the one regulating portion 10, a rail portion 12, which supports the one lateral edge portion of the IC card and regulates the downward movement, is formed.

Further, a supporting portion 13 for supporting the top end edge of the IC card from the lower part is provided between the rear ends of a pair of the regulating portions 10, 11.

Further, at the inner side of the supporting portion 13, a stopper 14 that stops the IC card at a predetermined position is provided by abutting against the top end of the IC card.

Further, in the front of the stopper 14, a contact block 16 having a plurality of contacts 15 at the under surface for bringing them into contact with a plurality of terminals on one surface side of the IC card received to a predetermined position is vertically movably supported (supporting mechanism is not shown).

Further, one end side of a detection member 17 for detecting the insertion of the IC card is projected between the stopper 14 and the contact block 16.

This detection member 17 receives the inserting force of the IC card at one end side and allows the other end side to move so as to allow the contact block 16 to descend on one end side of the IC card to bring the contact 15 into contact with the terminal of the IC card, thereby making it possible to give/receive information for the IC card (supporting mechanism is not shown).

In the IC card processor 5 constituted in this way, when the regular IC card 1 is inserted from the slit 7 of the card slot 6, the lateral movement of the IC card 1 is regulated by a pair of regulating portions 10, 11, and the one lateral edge portion of the IC card 1 is guided to the inner side, while being supported by the rail portion 12 from the lower part, and as shown in FIG. 41A, the top end of the IC card 1 which reached the supporting portion 13 is abutted against one end of the detection member 17.

When the IC card 1 is further pushed, as shown in FIG. 41B, the detection member 17 turns so as to allow the contact block 16 to descend, and when the top end of the IC card 1 reaches a predetermined position to abut against the stopper 14, each contact 15 of the contact block 16 contacts each terminal (not shown) provided on one surface side of the IC card 1 by adequate contact pressure.

In this way, it is possible to deal with the information for the IC card 1.

Further, this IC card processor 5 regulates its lateral movement and its downward movement at the one lateral side of the IC card, and guides the lateral movement only to a predetermined position in a regulated state at the other side, so that the foreign matter which passed through the slip 7 of the card slot 6 can be discharged from the underside surface side.

For example, as shown in FIG. 42A, in the case where the card-like foreign matter 2 having a width same as that of the regular IC card and a length shorter than the distance from the slip 6 to the front edge of the supporting portion 13 is inserted, when the rear end of this foreign matter 2 passes through the front end of the substrate 9, the edge portion of the regulating portion 10 side of the foreign matter 2 is supported from the lower part, while there is no support from the lower part for the other edge portion side.

For this reason, this foreign matter 2 has the other edge portion side descended and inclined, and by this inclination, one edge portion side slips off the rail portion 12 as shown in FIG. 43.

For this reason, this foreign matter 2 is dropped and discharged downward from the substrate 9 as shown in FIG. 42B.

However, in the above-described IC card processor 5, as shown in FIG. 44A, when the regular IC card 1 is inserted in a state where the rear end of the card-like foreign matter 2 is inserted into a position slightly going beyond the slit 7, the foreign matter 2 advances into the inner side by being pushed at its rear end by the IC card 1.

At this time, when inserting speed of the IC card 1 is low, the foreign matter 2 slips off the rail portion 12 so as to be dropped and discharged as described above before its top end reaches the supporting portion 13 so that the IC card 1 can be inserted to a predetermined position.

However, when the inserting speed of the IC card 1 is high, the one edge portion of the foreign matter 2 reaches the supporting portion 13 before its top end slips off the rail portion 12 so that it moves the detection member 17 and advances to a position which abuts against the stopper 14.

For this reason, as shown in FIG. 44B, the detection member 17 allows the contact block 16 to descend on this foreign matter 2 so as to bring the contact 15 into contact with it.

When the IC card 1 is forcibly inserted in a state where the contact 15 is brought into contact with the foreign matter 2 in this way, the top end of the IC card 1 passes between the foreign matter 2 and the substrate 9 and collides with the contact 15, thereby damaging the contact 15, so that the equipment cannot be used hereinafter.

Further, as shown in FIG. 44C, when the IC card 1 is forcibly inserted in a state where the contact 15 is brought into contact with the foreign matter 2 in this way, when the top end of the IC card 1 collides with the rear end of the foreign matter 2, the IC card 1 is unable to advance further and the equipment cannot be used hereinafter.

Further, the foreign matter that advanced to the position abutting against the stopper 14 in this way cannot be extracted nor dropped and discharged, and hereinafter, the equipment cannot be used by the IC card 1.

Furthermore, since the card processor used in the equipment utilized by an unspecified person as described above is fixed at the inner side of a casing of the equipment including a card stopper 6, an extremely complicated work is required for a service man to open the casing of the equipment and take out the foreign matter from the card processor in order to utilize the equipment.

DISCLOSURE OF INVENTION

An object of the present invention has been carried out in view of the points at issue and it is the object of the present invention to provide an IC card processor wherein there is no damage of a contact due to double insertion of a card-like foreign matter and an IC card, and even when a card having a large warp is inserted, it can be correctly brought into contact with a terminal of the IC card with uniform contact-pressure.

Another object of the present invention has been carried out in view of the points at issue and it is the object of the present invention to provide the IC card processor wherein the damage of the contact due to double insertion of the card-like foreign matter and the IC card can be prevented.

Still another object of the present invention has been carried out in view of the points at issue and it is the object of the present invention to provide the IC card processor wherein the card-like foreign matter existing in the inner side can be easily removed.

In order to achieve the objects, according to the present invention, there is provided (1) an IC card processor comprising:
 a card slot (21) defining a space in which the IC card is received;
 a contact block (70) having a plurality of contacts (80) on one surface which respectively contact a plurality of contact points provided on one surface of the IC card received inside the card slot;
 a supporting mechanism (71–78, 85–93) which supports movably the above contact block in a vertical direction to the above one surface of the IC card received in the card slot, swingingly around a first axis line which passes the center of the plurality of contacts of the contact block in the inserting direction of the IC card, and swingingly around a second axis line which passes the center of the plurality of contacts of the contact block in the lateral direction of the IC card; and
 an elastic member (94) which abuts against the contact block at only one point and applies a force to press the plurality of contacts of the contact block on one surface side of the IC card,
 wherein that a point of the place to which the pressing force is applied by the elastic member exists on an axis line which passes a cross point of the first axis line and the second axis line and extends vertically.

Further, in order to achieve the objects, according to the present invention, there is provided (2) the IC card processor as recited in (1), wherein the contact block changes its attitude according to the inclination of the IC card with a position to which the pressing force of the elastic member is applied as a supporting point of the swinging and is set to be movable in a separating direction from one surface side of the IC card by elastic deformation of the elastic member which received a force from one surface side of the IC card.

Further, in order to achieve the objects, according to the present invention, there is provided (3) the IC card processor as recited in (2), wherein the supporting mechanism has a movable member (85) which receives the inserting force of the IC card at one end side and brings the other end side near the opposite surface side of the contact block, and the elastic member is provided between the other end side of the movable member and a position corresponding to a substantial center of the plurality of contacts of the opposite surface of the contact block.

Further, in order to achieve the objects, according to the present invention, there is provided (4) the IC card processor as recited in (3), wherein the plurality of contacts of the contact block absorb the inserting force of the IC card by adding the elastic deformation amount of the elastic member, and have an elastic deformation amount sufficient enough to give an adequate pressing force with a predetermined attitude adjustment range at each contact point which is provided on one surface side of the IC card.

Further, in order to achieve the above describe objects, according to the present invention, there is provided (5) the IC card processor as recited in (3), wherein the elastic member is a coil spring which is elastically provided between the other end side of the movable member and the position corresponding to a substantial center of the plurality of contacts of the opposite surface of the contact block.

Further, in order to achieve the objects, according to the present invention, there is provided (6) the IC card processor as recited in (3), wherein the elastic member is a plate spring (104), one end side thereof being fixed to the movable member (85') and the other end side thereof pressing against the top end of a projection which is provided upright at a substantially central position of the plurality of contacts of the contact block.

Further, in order to achieve the objects, according to the present invention, there is provided (7) the IC card processor as recited in (3), wherein the movable member pushes the inserted IC card upward from the lower part to the contact block side to allow a plurality of contacts of the contact block to contact each contact point of the IC card, and the elastic member is a coil spring (104) which is elastically provided between a spring bracket (105) fixed to a substrate and a projection (72) provided in the contact block.

Further, in order to achieve the objects, according to the present invention, there is provided (8) the IC card processor as recited in (3), wherein the movable member pushes the inserted IC card upward from the lower part to the contact block side and allows a plurality of contacts of the contact block to contact each contact point of the IC card, and the elastic member is a plate spring, one end side thereof being fixed to a substrate (37) and the other end side thereof pressing against the top end of a projection (72) which is provided upright at a substantially central position of the plurality of contacts of the contact block.

Further, in order to achieve the objects, according to the present invention, there is provided (9) the IC card processor as recited in (1) further comprising:
 a linear rail portion (96) extending from the lower part of one lateral side of the card slot in the inserting direction and supporting one lateral end side of the IC card inserted from the card slot;
 a pair of lateral regulating portions (43, 55, 56) which regulates the lateral movement of the IC card inserted from the card slot; and
 a stopper (53) which abuts against the top end of the IC card inserted from the card slot to stop the IC card at a predetermined position,
 wherein, among the pair of lateral regulating portions, the one lateral regulating portion (43) positioned at the side opposite to the rail portion includes a first regulating portion (43) provided in the vicinity of the card slot and a second regulating portion (52) provided in the vicinity of the stopper,
 among the pair of lateral regulating portions, a width between the other lateral regulating portion (55, 56) and the portion between the first regulating portion and the second regulating portion is sufficiently large with respect to the width of the IC card, and a space between the pair of lateral regulating portions is opened downward.

Further, in order to achieve the objects, according to the present invention, there is provided

(10) the IC card processor as recited in (9) further comprising a detection member which detects the insertion of the IC card within a positional range between the plurality of contacts and the stopper, and allows the giving/receiving of information to/from the IC card by moving the contact block to one surface side of the above described IC card inserted to the predetermined position and bringing the plurality of contacts into contact with the terminals of the IC card, wherein the detection member detects the insertion of the IC card in a space from a rear position of the plurality of contacts to the second regulating portion of the other lateral regulating portion.

Further, in order to achieve the objects, according to the present invention, there is provided

(11) the IC card processor as recited in (1) further comprising:

a linear rail portion extending from the lower part of one lateral side of the card slot in the inserting direction, and supporting one lateral side end of the IC card inserted from the card slot;

a member for constituting an escaping portion defined on the rail portion, the member having a height from the upper surface of the rail portion larger than two times a thickness of the IC card;

a stopper for abutting against the top end of the IC card inserted from the card slot to stop the IC card at a predetermined position;

a supporting portion (97) provided in the vicinity of the stopper, the supporting portion supporting the under surface of the top end portion of the IC card stopped at the predetermined position by the upper surface; and an upward regulating portion (52) provided in the vicinity of the contact block which regulates the upward movement of the IC card by its under surface, the top end portion of the under surface of the IC card being supported by the supporting portion, wherein the distance between the upper surface of the supporting portion and the under surface of the upward regulating portion (52) is set to be more than a thickness of one piece of the IC card, and less than a thickness of two pieces of the IC card.

Further, in order to achieve the objects, according to the present invention, there is provided

(12) the IC card as recited in (11), wherein a space having a height from above the upper surface of the rail portion larger than a thickness of two pieces of the IC card and a width wider than the upper surface of the rail portion is formed on a portion opposite to the upper surface of the rail portion so that an escaping portion (44) is formed so as to enable the edge portion of the card body having a thickness of two piece portion of the IC card to pass through on the upper surface of the rail portion.

BRIEF DESCRIPTION OF DRAWINGS

FIG. 22 is a schematic view for showing a modified example of the IC card processor according to the first embodiment of the present invention;

FIG. 23 is a schematic view for showing a modified example of the IC card processor according to the first embodiment of the present invention;

FIGS. 41A and 41B are schematic views for explaining the action at the inserting time of the regular card in the conventional IC card processor;

FIGS. 42A and 42B are schematic views for explaining the action at the inserting time of the short card-like foreign matter in the conventional IC card processor;

BEST MODE OF CARRYING OUT OF THE INVENTION

Figure 1:
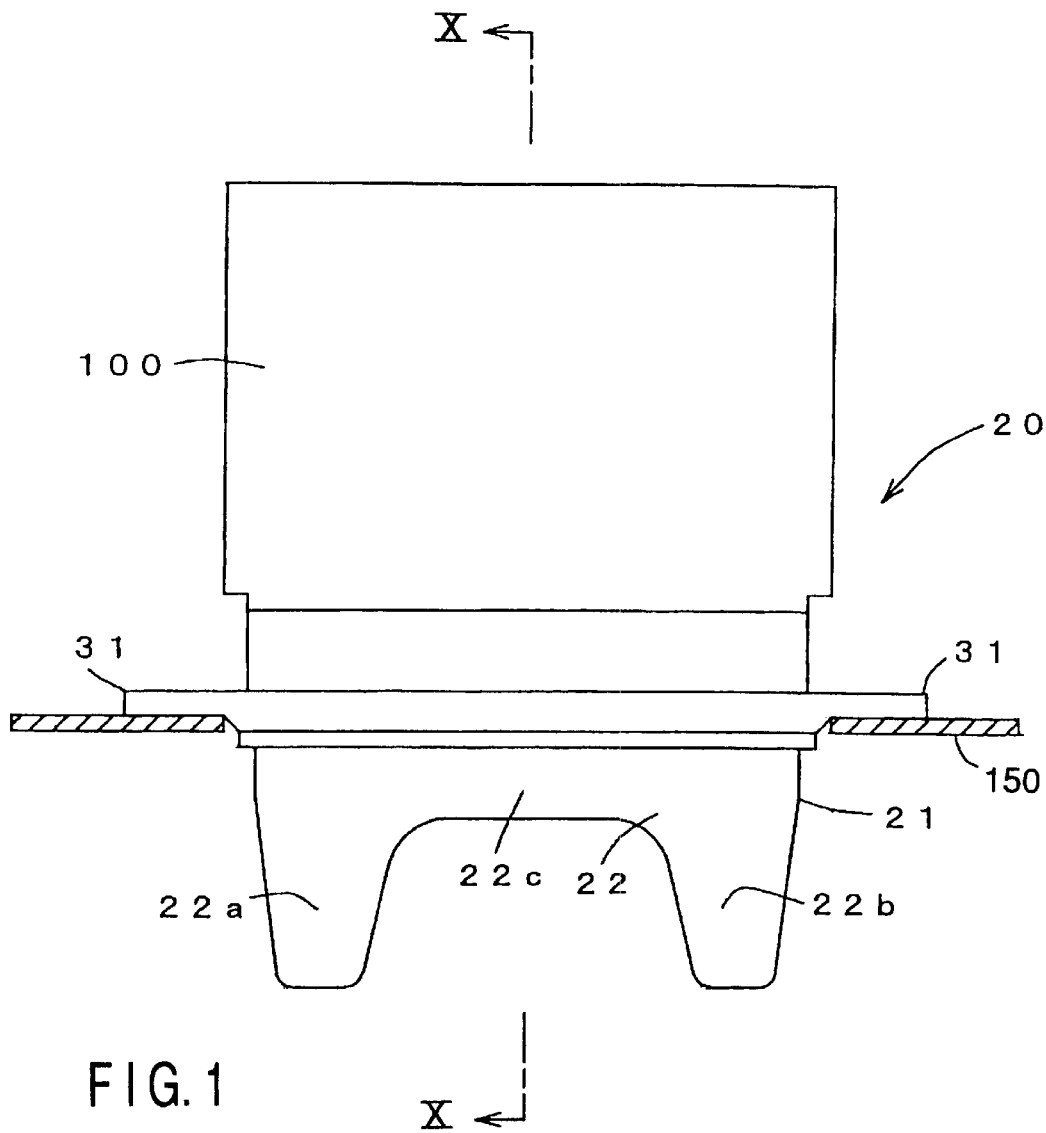
FIG. 1 is a plan view of an IC card processor according to a first embodiment of the present invention.
Figure 2:
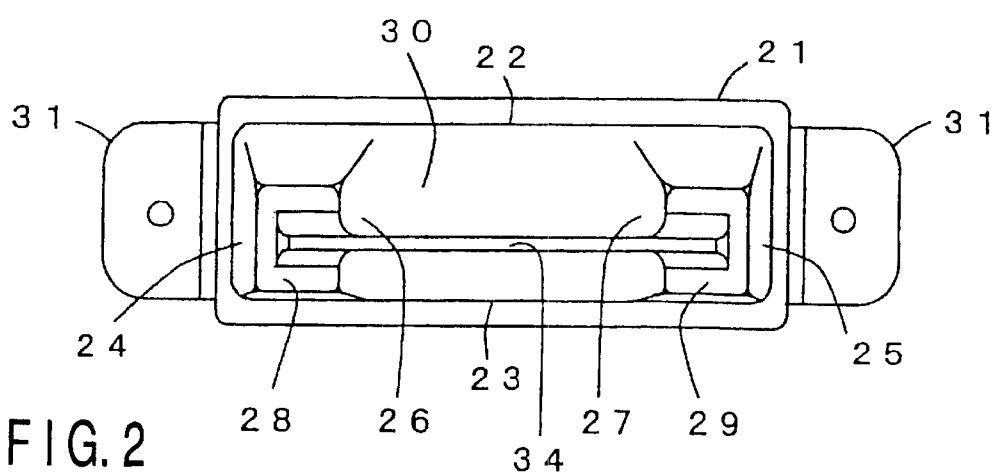
FIG. 2 is a front view of the IC card processor according to the first embodiment of the present invention.
Figure 3:
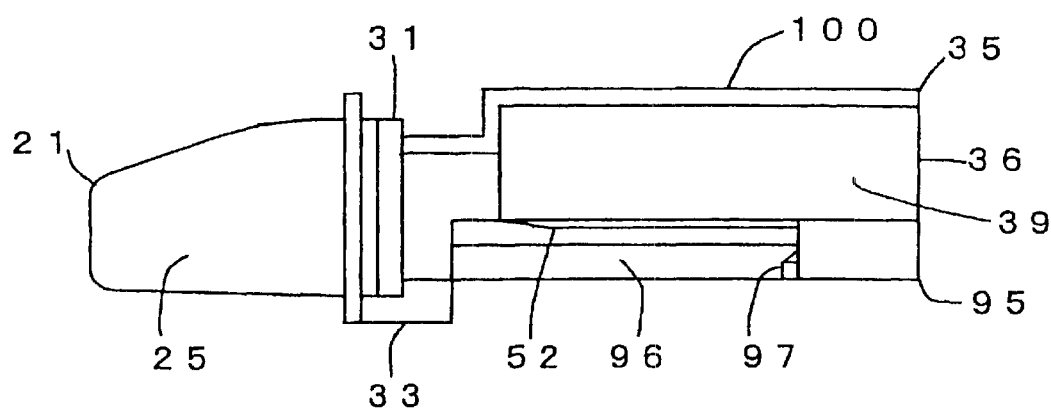
FIG. 3 is a sectional view of the IC card processor according to the first embodiment of the present invention.
Figure 4:
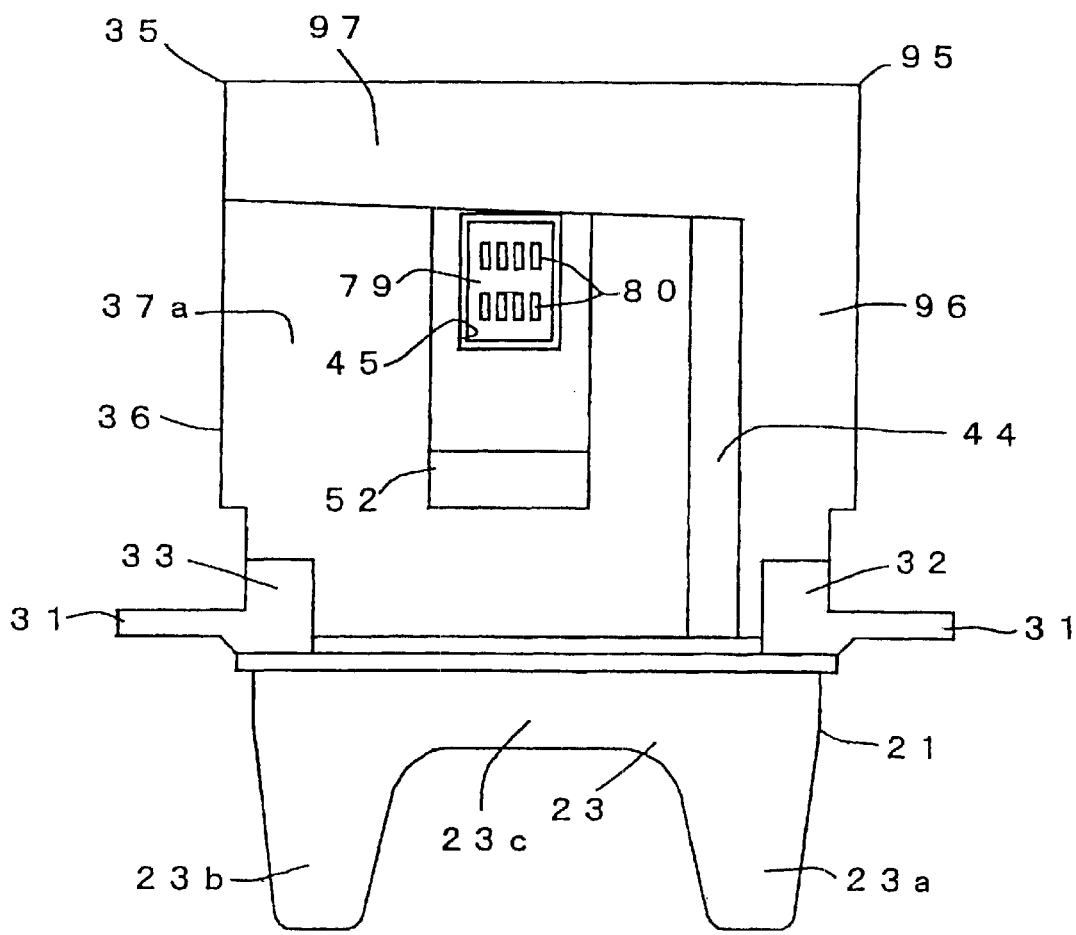
FIG. 4 is a bottom view of the IC card processor according to the first embodiment of the present invention.

Hereinafter, each embodiment of the present invention will be described with reference to the drawings.

(First Embodiment)

FIGS. 1 to 11 show a constitution of an IC card processor 20 and the essential portion thereof according to a first embodiment adopting the present invention.

This IC card processor 20 is constituted by a card slot 21 and a processor main body 35 as shown in FIGS. 1 to 4.

The card slot 21 is attached to the surface of a casing 150 of the equipment (for example, a public telephone) using an IC card and guides the IC card into the inside of a processor main body 35.

The card slot 21 has an upper plate 22 and a lower plate 23 which vertically oppose to each other, side plates 24, 25, 26, 27 covering a space between both side edges of right and left projecting portions 22a, 22b of the upper plate 22 and both sides edges of right and left projecting portions 23a, 23b of the under plate 23, respectively, front plates 28, 29 covering a space between the front edge of the right and left projecting portions 22a, 22b of the upper plate 22 and the front edge of the right and left projecting portions 23a, 23b of the under plate 23, respectively, and a front plate 30 covering a space between the front edge of a central portion 22c of the upper plate 22 and the front edge of a central portion 23c of the under plate 23, respectively, and the inside portion thereof is formed in a hollow shape.

The outer side plates 24, 25 are provided with flanges 31 to fix the whole of this card processor 20 to the casing 150 of the equipment by screws.

Further, at rear end both sides of the under plate 22, the supporting portions 32, 33 are extendedly provided for supportably fixing the processor main body 35.

Further, at the side plates 26, 27 inside the front plates 28, 29 and the center front plate 30, an oblong slit 34 for allowing the IC card to pass through from the front to the rear surface side is formed.

The height of the slit 34 is set to be larger than a thickness of one piece of the regular IC card and less than a thickness of two pieces of the regular IC card, and the width of the slit 34 is set to be slightly larger than the width of the regular IC card.

The processor main body 35 provided at the backside of the card slot 21 is integrally constituted by a base member 36, a rail member 95 and a cover 100 which are superposed in three layers up and down.

Figure 5:
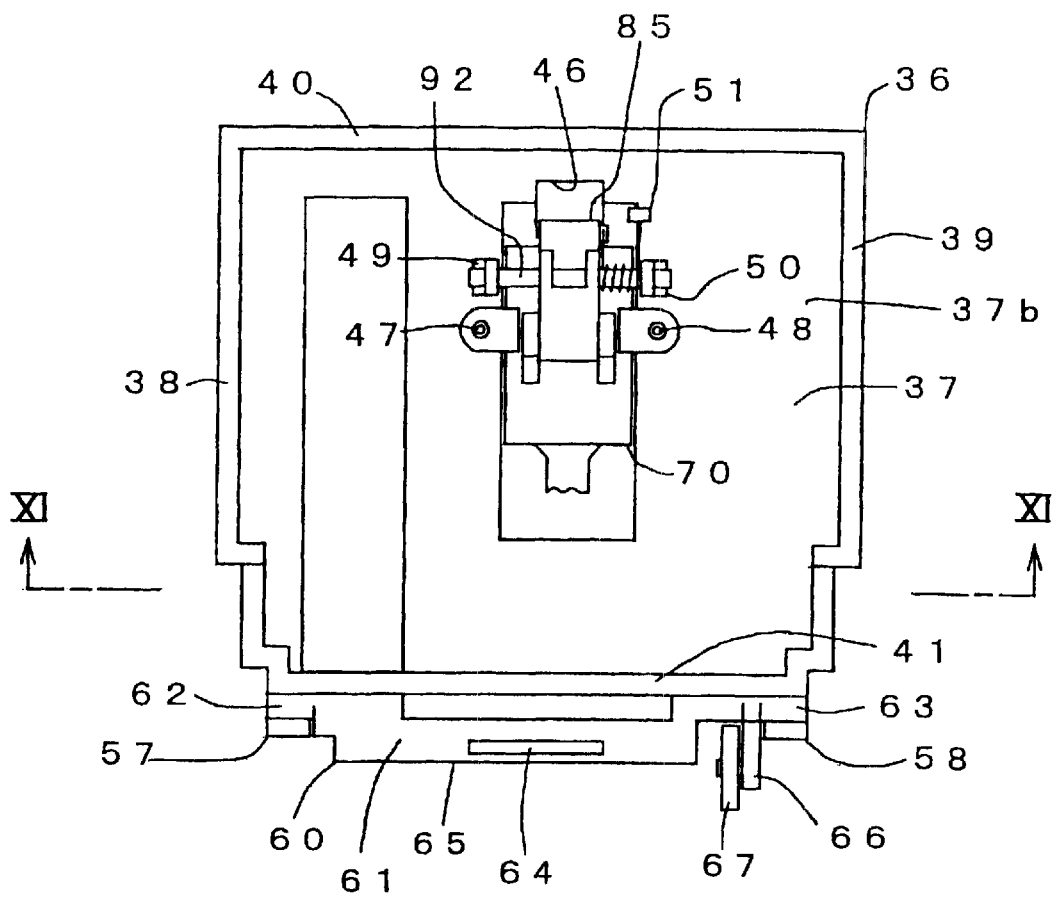
FIG. 5 is a plan view of the IC card processor according to the first embodiment of the present invention in a state of a card slot being removed.
Figure 6:
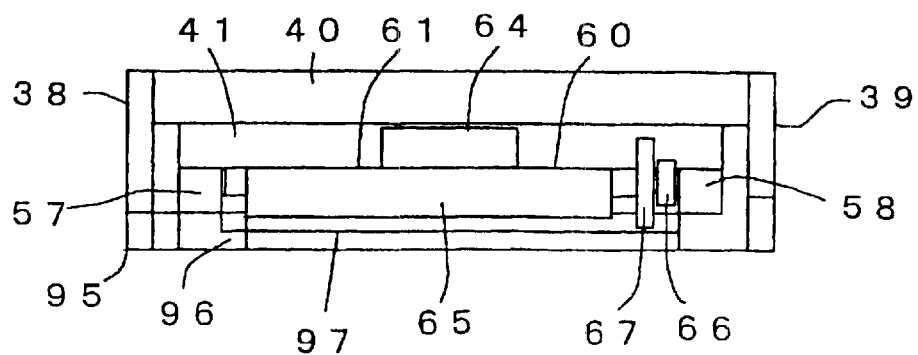
FIG. 6 is a front view of the IC card processor according to the first embodiment of the present invention in a state of the card slot being removed.

The base member 36 is, as shown in FIG. 5, formed by a substantially rectangular substrate 37, side plates 38, 39 provided upright at the upper part so as to mutually oppose along the edges of both sides of the substrate 37, a rear plate 40 provided upright along the edge of the rear portion of the substrate 37 so as to link with the side plates 38, 39, and a front plate 41 provided along the edge of the front portion of the substrate 37 so as to link with the front ends of the side plates 38, 39.

At the right end of an under surface 37a of the substrate 37, a first regulating portion 43 for regulating the lateral movement to the one side for the IC card inserted from the slit 34 of the card slot 21 is formed.

The first regulating portion 43 is constant in the height from the under surface 37a of the substrate 37 and is projected so as to be continuous back and forth.

A wall surface 43a inside the first regulating portion 43 matches a surface where the inner wall surface of one end side of the slit 34 of the card slot 21 is extended backward.

In this way, the IC card is moved back and forth so that the one side end surface of the IC card inserted from the slit 34 is allowed to slide to the wall surface 43a.

Figure 11:
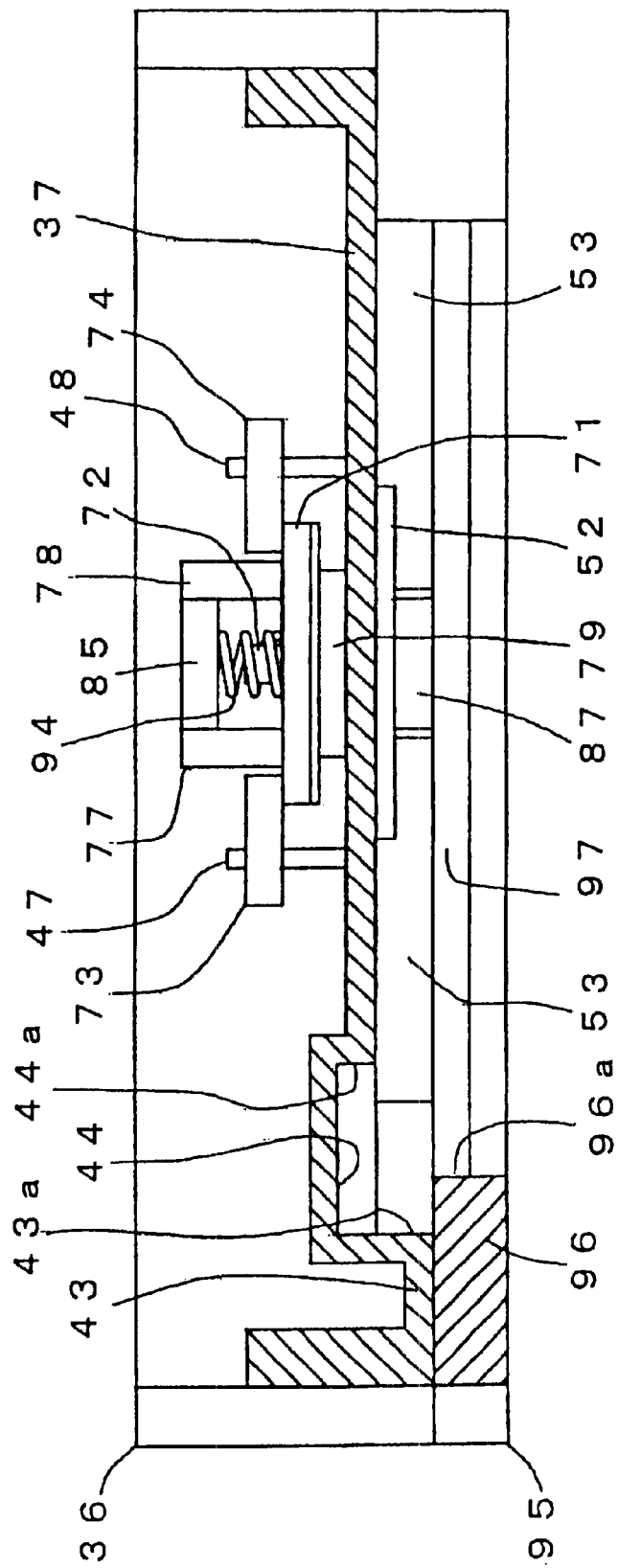
FIG. 11 is an enlarged sectional view taken along the X–X1 Line in FIG. 5.

Inside the first regulating portion 43, as shown in FIG. 11, a groove 44 having a predetermined width which is sunk to a predetermined depth to an upper surface 37b side of the substrate 37 is continuously formed from the front end to the vicinity of the rear end of the substrate 37.

The inner wall surface of the outside of the groove 44 is continuous to the wall surface 43a of the first regulating portion 43.

Figure 7:
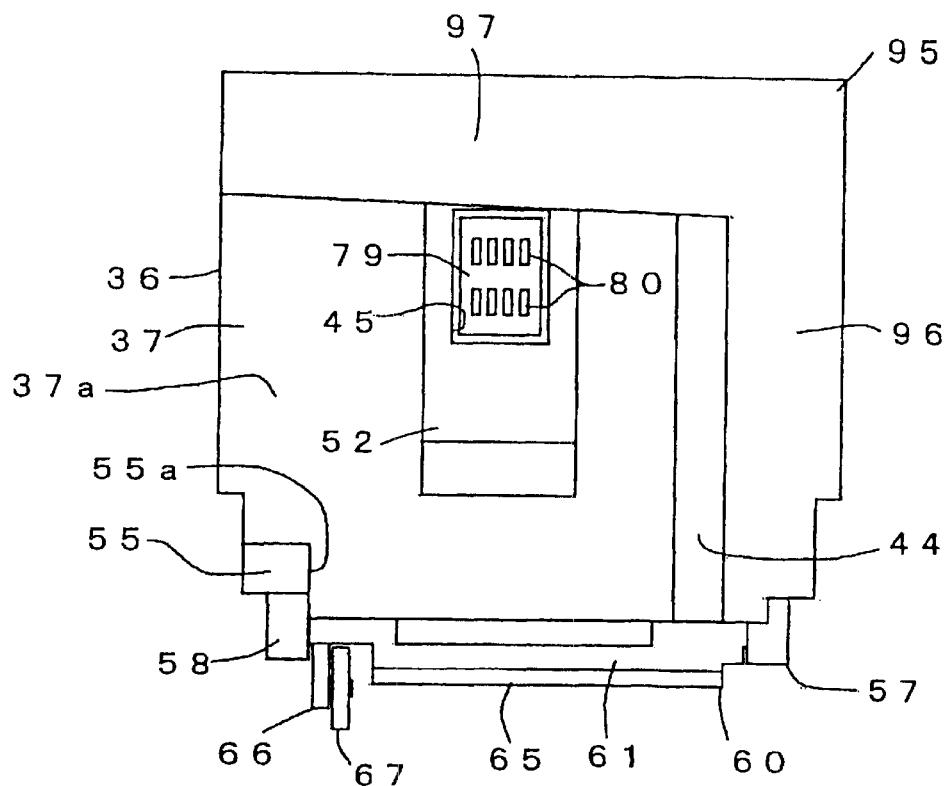
FIG. 7 is a bottom view of the IC card processor according to the first embodiment of the present invention in a state of the card slot being removed.
Figure 8:
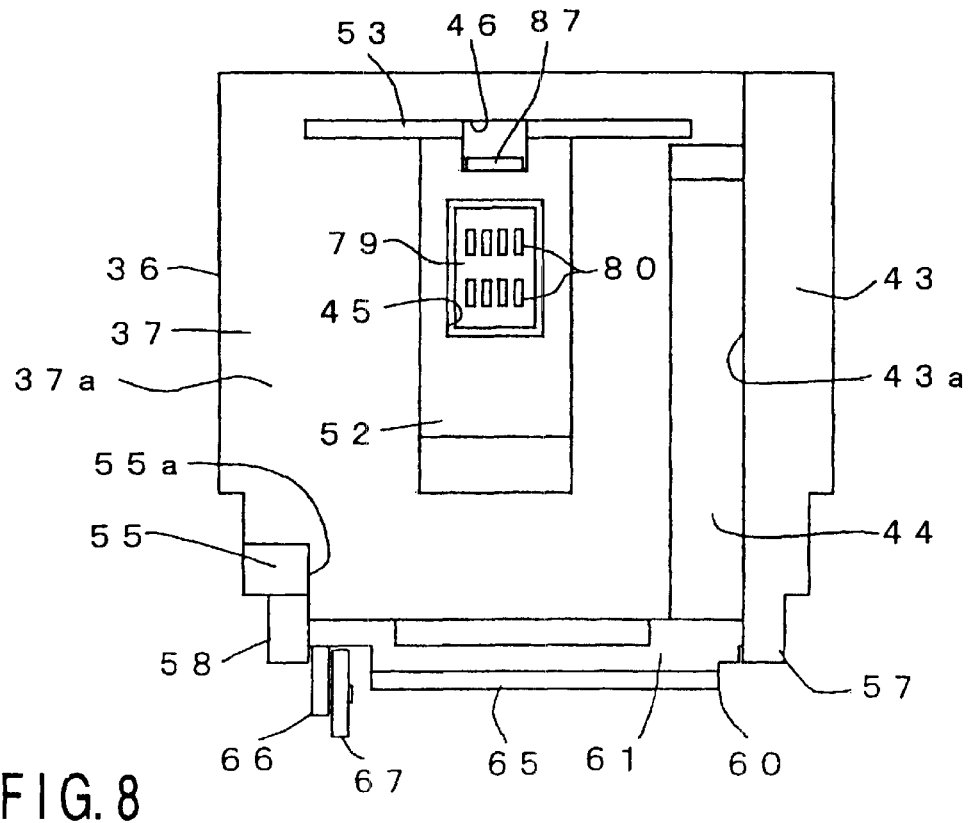
FIG. 8 is a bottom view of the IC card processor according to the first embodiment of the present invention in a state of the card slot and a rail member being removed.
Figure 10:
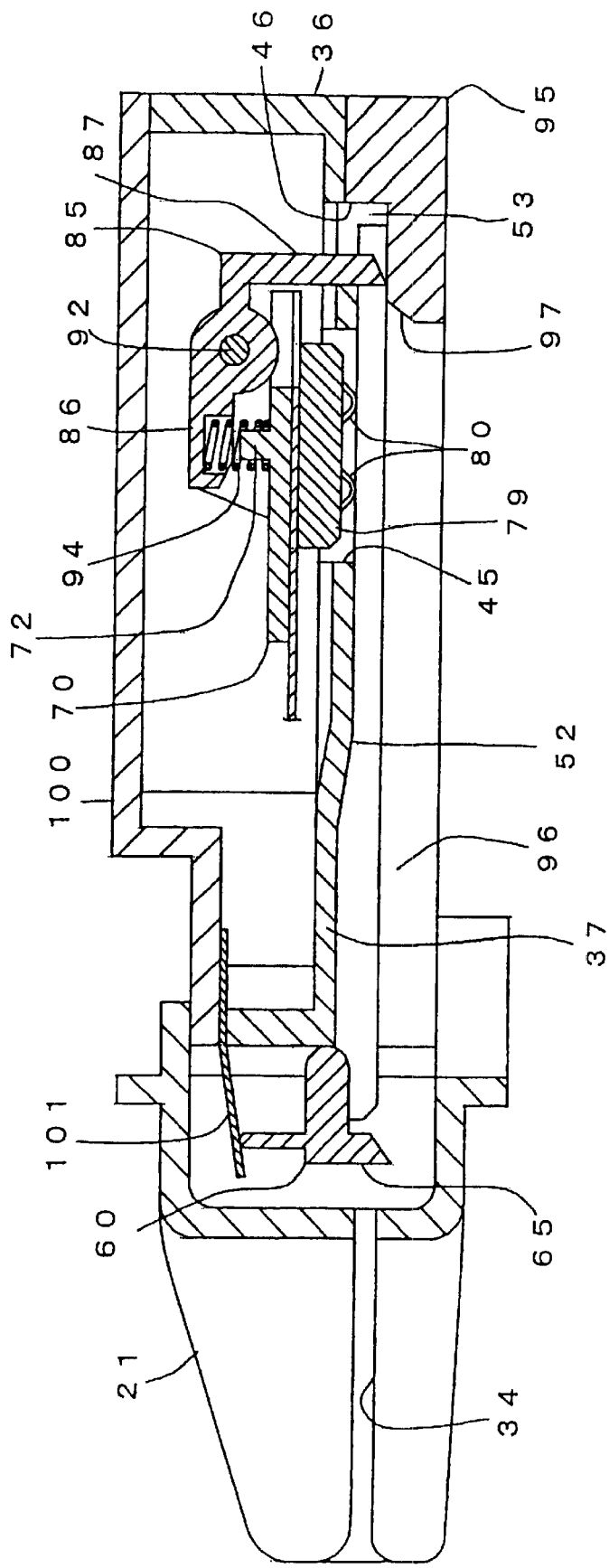
FIG. 10 is an enlarged sectional view taken along the X–X1 line in FIG. 1.

Further, slightly at the rear of the center of the substrate 37, as shown in FIGS. 7, 8 and 10, a rectangular hole 45 for allowing a contact portion of a contact block 70 to be described later to pass through is penetrably formed up and down.

At the rear portion of this hole 45, a rectangular hole 46 for allowing a movable member 85 to be described later to pass through is penetrably formed up and down.

At both sides of the hole 45, supporting axes 47, 48 are provided upright as supporting members for vertically movably and swingingly supporting the contact block 70.

At the rear of supporting axes 47, 48, bearings 49, 50 for supporting both ends of a shaft 92 to be described later are provided upright.

Further, a spring hook 51 is projectingly provided at the rear of the one bearing 50.

Substantially at the center of the under surface 37a of the substrate 37, a second regulating portion 52 is formed, which slightly projects downward with a predetermined width from the front portion to the rear portion and regulates the IC card inserted from the slit 34 of the card slot 21 so that the top end thereof does not abut against the contact block 70.

Further, at both sides of the hole 46, a stopper 53 is formed, which projects downward from the under surface 37a of the substrate 37 with a projecting length larger than that of the second regulating portion 52 and abuts against the top end of the inserted IC card so as to stop the advancement of the IC card.

This stopper 53 has the same height as that of the first regulating portion 43.

A third regulating portion 55 is projectingly provided downward at the left end of the front end of the under surface 37a of the substrate 37.

The third regulating portion 55 is formed in a square pole shape.

A wall surface 55a inside the third regulating portion 55 matches a surface where the other side inside wall surface of the slit 34 of the card slot 21 is extended backward, and regulates the lateral movement of the IC card between itself and the wall surface 43a of the first regulating portion 43.

At the front surface side both ends of the front plate 41, shutter supporting portions 57, 58 are projectingly provided.

An inner wall of the shutter supporting portion 57 is continuous to the inner wall surface 43a of the first regulating portion 43, and an inner wall of the shutter supporting portion 58 is continuous to the inner wall surface 55a of the third regulating portion 55 and regulates the lateral movement of the IC card.

The shutter member 60 supported by the shutter supporting portions 57, 58 is, as shown in FIGS. 5 to 8, constituted by a laterally formed base portion 61, axis portions 62, 63 engaged with the shutter supporting portions 57, 58 which are projectingly provided on both sides of the base portion 61, a projection 64 projected upward from the front portion of the base portion 61, a shutter plate 65 extended downward from the front edge of the base portion 61, an arm portion 66 extended frontward from the one axis portion 63 and a roller 67 which turns with an axis parallel to the axis portion 63 attached to the top end of the arm portion 66 as a center.

The shutter member 60 is always supported in such a manner that the lower end of its shutter plate 65 is positioned lower than the lower edge of the slit 34 of the card slot 21 and the rotational center of the roller 67 is positioned farther onward than the shatter plate 65, and the lower end position of its outer periphery is positioned lower than the lower end position of the shutter plate 65.

In this way, when the regular IC card is inserted from the slit 34 of the card slot 21, the top end edge of the IC card is abutted against the outer peripheral lower portion of the roller 67 and the inserting force of the IC card is transmitted to the axis portion 63 via the arm portion 66, so that the shutter 65 is rotatably moved to the upper side by a distance corresponding to a thickness of the IC card, thereby making it possible for the inserted IC card to pass through the slip 34 and advance to the under surface side of the substrate 37.

Further, when the card-like foreign matter thinner than the regular thickness and the card-like foreign matter having a narrow width such as to pass through the inner side of the roller 67 are inserted, since the upward moving distance of the shutter plate 65 is either short or the plate is prevented from moving at all, the foreign matter abuts against the shutter 65 and is prevented from advancing to the under surface 37a of the substrate 37.

On the other hand, on the supporting axes 47, 48 provided upright at the upper surface 37b side of the substrate 37, the contact block 70 is supported.

Figure 9:
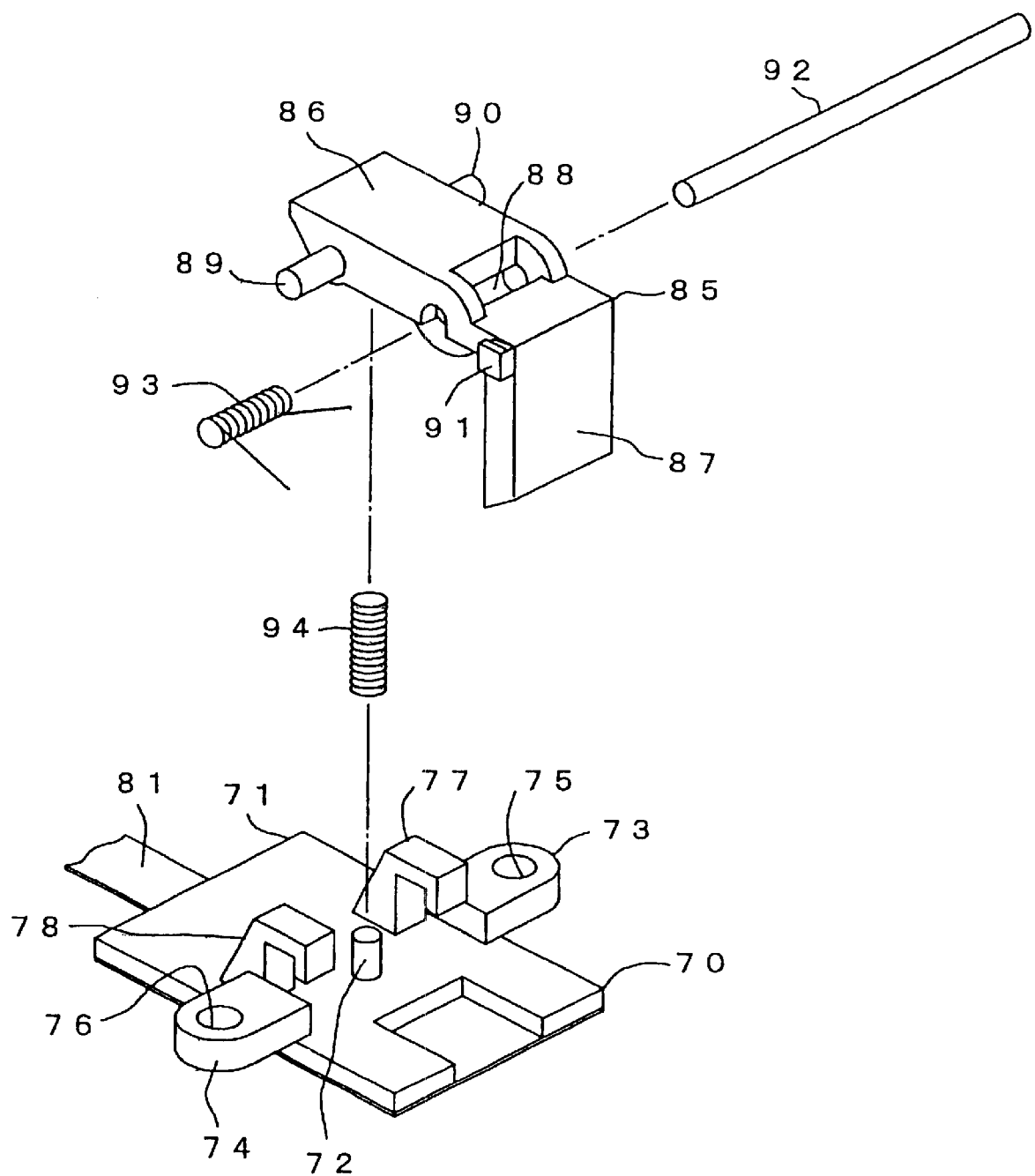
FIG. 9 is an exploded perspective view of an essential portion of the IC card processor according to the first embodiment of the present invention.

The contact block 70 has, as shown in FIG. 9, a substantially rectangular substrate 71, and at the substantial center of the upper surface of the substrate 71, a cylindrical projection 72 projecting upward is provided.

Further, on both sides of this projection 72, the arm portions 73, 74 are extendedly symmetrically provided.

At the top end sides of the arm portions 73, 74, holes 75, 76 that allow the supporting axes 47, 48 to pass through in a state of having a space are provided.

Further, fluke-like hooks 77, 78 are projectingly provided between the projection 72 and the arm portions 73, 74.

A rectangular contact plate 79 is fixed at the substantial center of the under surface of the substrate 71.

A plurality of contacts 80 (here eight pieces) are projectingly provided at the under surface of the contact plate 79.

These contacts 80 have a downward projecting length shorter in contrast to the conventional contact in order to prevent the damage due to double insertion of the foreign matter and the card, and yet are formed so as to have large strength (rigidity) and little elastic deformation amount.

Incidentally, the projection 72 of the substrate 71 is positioned at the opposite surface side of the central position of a plurality of contacts provided in the contact plate 79, and a plurality of contacts 80 are connected to an unillustrated circuit substrate via a flexible substrate 81 held between the contact plate 79 and the substrate 71.

This contact block 70 is vertically movable so that the contact plate 79 can pass through the hole 45 by the supporting axes 47, 48 inserted through the holes 75, 76 of the arm portions 73, 74, and is supported so as to be able to swing left and right and back and forth in the inside of the hole 45.

A first plate portion 86 of the movable member 85 is extended above the contact block 70.

The movable member 85 is, as shown in FIG. 9, formed in an L letter shape by the substantially rectangular first plate portion 86 and a substantially rectangular second plate portion 87 which extends downward from the rear end of the first plate portion 86.

A shaft hole 88 laterally penetrated is provided at the rear portion of the first plate portion 86, and pins 89, 90 engaged with the hooks 77, 78 of the contact block 70 are projectingly provided at both side portions of the top end side of the first plate portion 86.

Further, a spring hook 91 is projectingly provided at the one side portion of the rear end of the first plate portion 86.

The movable member 85 hangingly supports the contact block 70 at the top end side of the first plate portion 86 by the shaft 92 supported at both ends by the bearings 49, 50, which pass through the shaft hole 88.

Further, the movable member 85 is rotatably supported with the shaft 92 as a center in a state where the lower end of the second plate portion 87 is projected from the hole 46 to the under surface side of the substrate 37a.

Further, a spring 93 is attached at one end side of the shaft 92.

The one end side of this spring 93 is hung on the spring hook 91, and the other end side is hung on the spring hook 51 of the substrate 37.

In this way, the movable member 85 is always energized in a direction where the lower end inner surface side of the second plate portion 87 abuts against the wall surface of the front end side of the hole 46 by this spring 93.

Further, a coil spring 94 as an elastic member is attached so as to be held between the under surface of the top end side of the first plate portion 86 of the movable member 85 and the projection 72 of the contact block 70.

The coil spring 94 is held in an elastically deformed state between the first plate portion 86 of the movable member 85 and the projection 72, and its elastic recovery force is collectively applied to a substantially central portion of the substrate 71 of the contact block 70, that is, to a position corresponding to a substantially central position of a plurality of contacts.

The rail member 95 is formed in an L letter shape by a rail portion 96 for supporting the one lateral edge portion of the IC card from downward which is inserted by extending back and forth so as to overlap the groove 44 of the substrate 37 of the base member 36 at the right side and a guide portion 97 for guiding the top end edge of the IC card to be inserted so as to abut against the stopper 53.

As shown in FIG. 11, a space between a wall surface 96a of the inner side of the rail portion 96 of the rail member 95 and a wall surface 44a of the inner side of the groove 44 is formed to be larger than a thickness of two pieces of the regular IC card.

Further, a space between the guide portion 97 and the under surface of the second regulating portion 52 of the substrate 37 side is set to be larger than a thickness of one piece of the regular IC card and to be less than a thickness of two pieces of the regular IC card.

As shown in FIG. 10, a cover 100 is formed so as to cover the upper surface side of the base member 36.

At the front end under surface side of this cover 100, a plate spring 101 is provided, which presses the projection 64 of the shutter member 60 downward and energizes it in a direction always to close the shutter 60.

Figure 12:
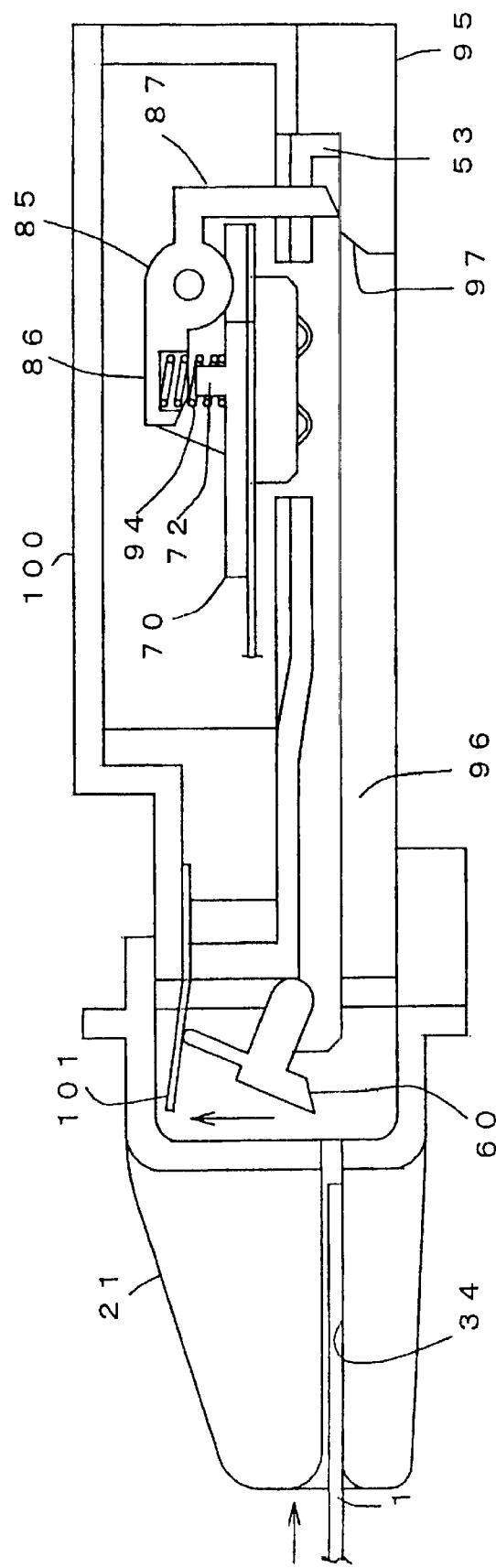
FIG. 12 is a schematic view for explaining the action of the embodiment at an inserting time of regular card in the IC card processor according to the first embodiment of the present invention.

In the IC card processor 20 as constituted above, when the regular IC card 1 is, as shown in FIG. 12, inserted into the slit 34 of the card slot 21 and its top end abuts against the under portion outer periphery of the roller 67 (not shown in FIG. 12) of the shutter member 60, the shutter member 60 turns upward and makes it possible for the IC card 1 to advance.

The IC card 1 which passed the lower part of the shutter member 60 is supported by the slit 34 and the rail portion 96 of the rail member 95 from downward, and advances to the inner part in a state of being regulated in the lateral movement by the slit 34, the wall surface 43a of the first regulating portion 43 and the wall surface 55a of the third regulating portion 55.

Figure 13:
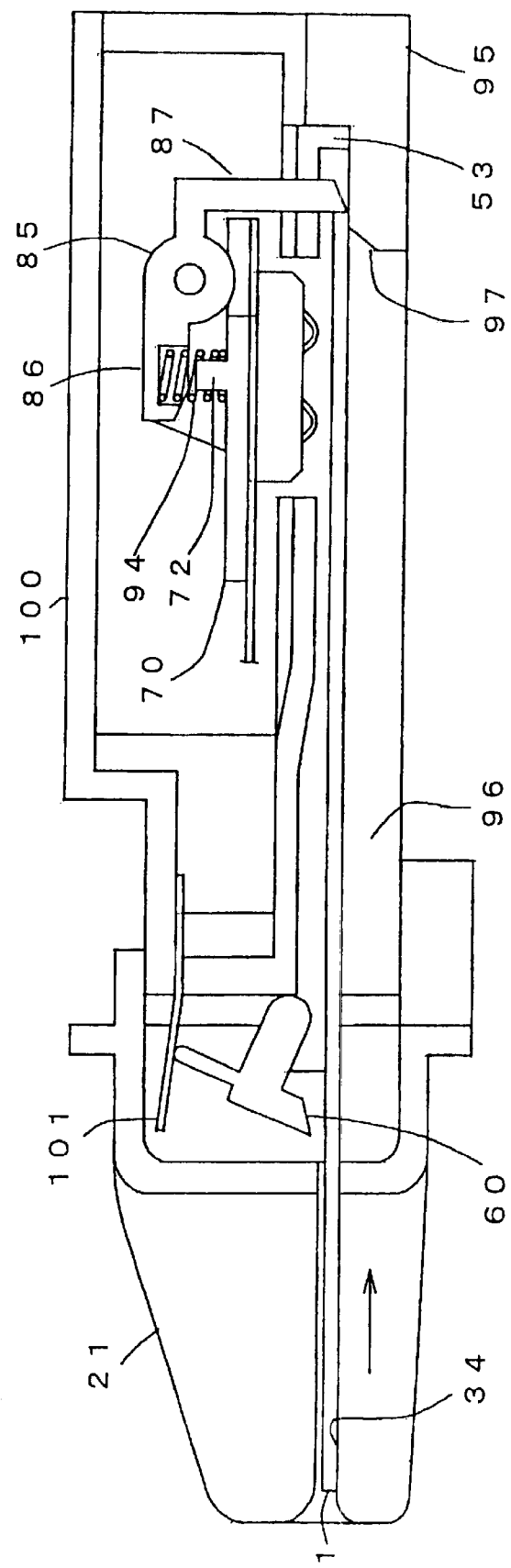
FIG. 13 is a schematic view for explaining the action of the embodiment at the inserting time of a regular card in the IC card processor according to the first embodiment of the present invention.

As shown in FIG. 13, the top end of the IC card 1 advances so as to run on the guide portion 97 of the rail member 95, and abuts against the lower end of the second plate portion 87 of the movable member 85.

Figure 14:
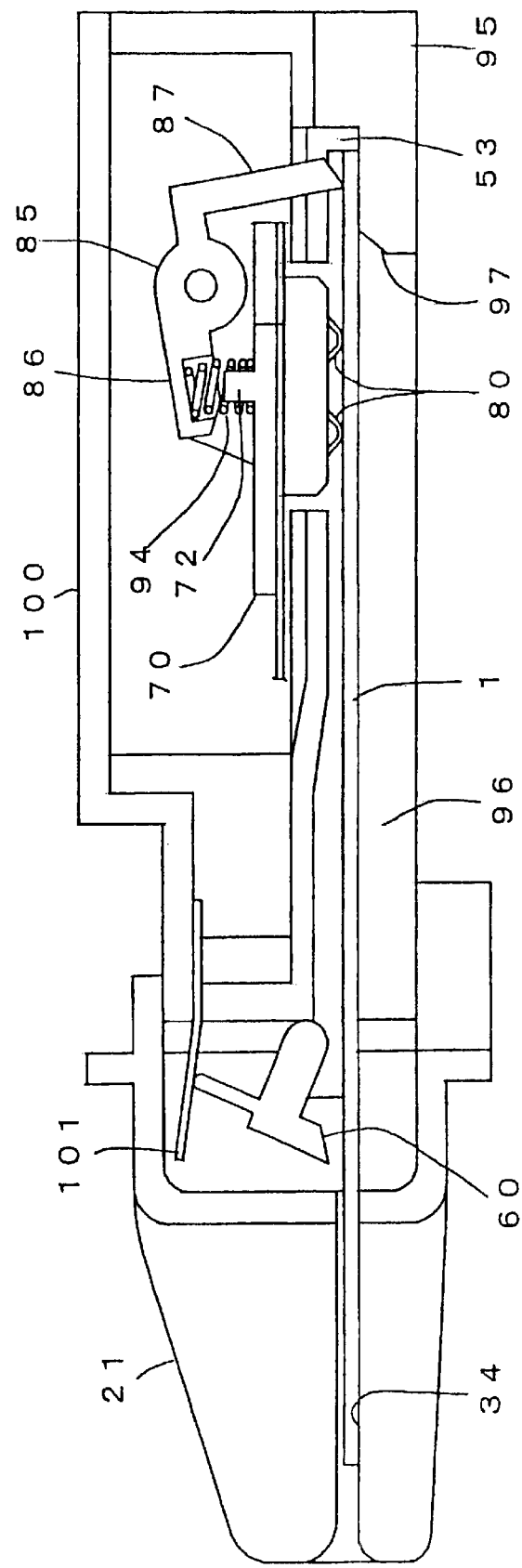
FIG. 14 is a schematic view for explaining the action of the embodiment at the inserting time of the regular card in the IC card processor according to the first embodiment of the present invention.

When the IC card 1 is further pushed to the inner part, as shown in FIG. 14, the movable member 85 turns counterclockwise to allow the contact block 70 to descend and move to one surface side of the IC card 1, and when the top end of the IC card 1 reaches a predetermined position to abut against the stopper 53, the contacts 80 of the contact block 70 contact the terminals (not shown) on the upper surface of the IC card 1, respectively, by an adequate contact pressure.

The plurality of contacts 80 of the contact block 70 shall absorb the inserting force of the IC card 1 by adding the elastic deformation amount of the coil spring 94, and have an elastic deformation amount sufficient enough to give an adequate pressing force with a predetermined attitude adjustment range at each contact point which is provided on one surface side of the IC card 1.

Incidentally, at this time, the lower end of the second plate portion 87 of the movable member 85 is put into a state of abutting against the upper surface of the IC card 1, and the recovery force of the spring 93 which energizes the movable member 85 is not exerted in a direction to return the IC card 1 to the card slot 21 side and even when the IC card 1 is off the hand, the IC card 1 is held in a position where its top end abuts against the stopper 5.

In this way, each contact 80 of the contact block 70 contacts the terminal of the IC card 1, which is inserted to a predetermined position, by an adequate contact pressure, so that the giving/receiving of information to/from this IC card 1 can be reliably performed.

Figure 15:
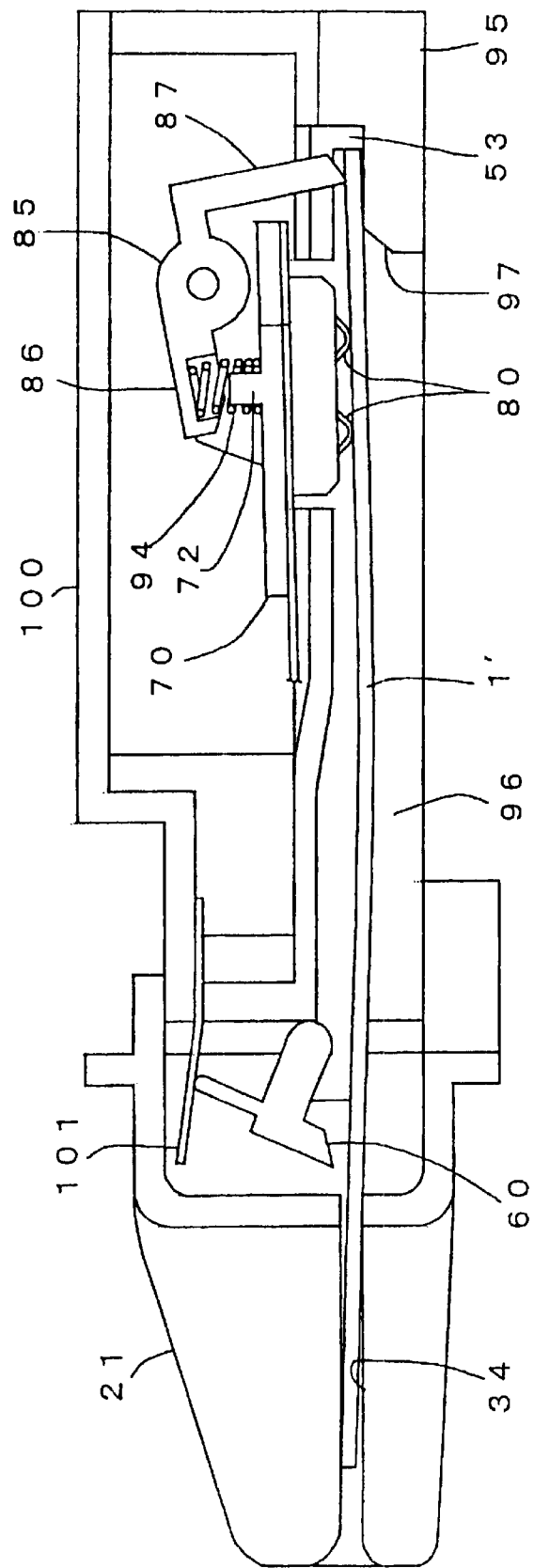
FIG. 15 is a schematic view for explaining the action of the embodiment at the inserting time of the regular card having a warp in the IC card processor according to the first embodiment of the present invention.

Further, even when the IC card 1' having a warp as shown in FIG. 15 is inserted, by matching the inclination of the IC card 1', the contact block 70 inclines with a part of the projection 72 as a center so that each contact 80 can contact the card by substantially uniform contact pressure, and therefore, the giving/receiving of information to/from the IC card 1' having a warp can be reliably performed.

Further, in the case where the card-like foreign matter having a length (for example, half the length or less) shorter than that of the regular card, when the rear end of the foreign matter passes through the shutter plate 65, the support for the foreign matter from downward is only from the rail portion 96.

Figure 16:
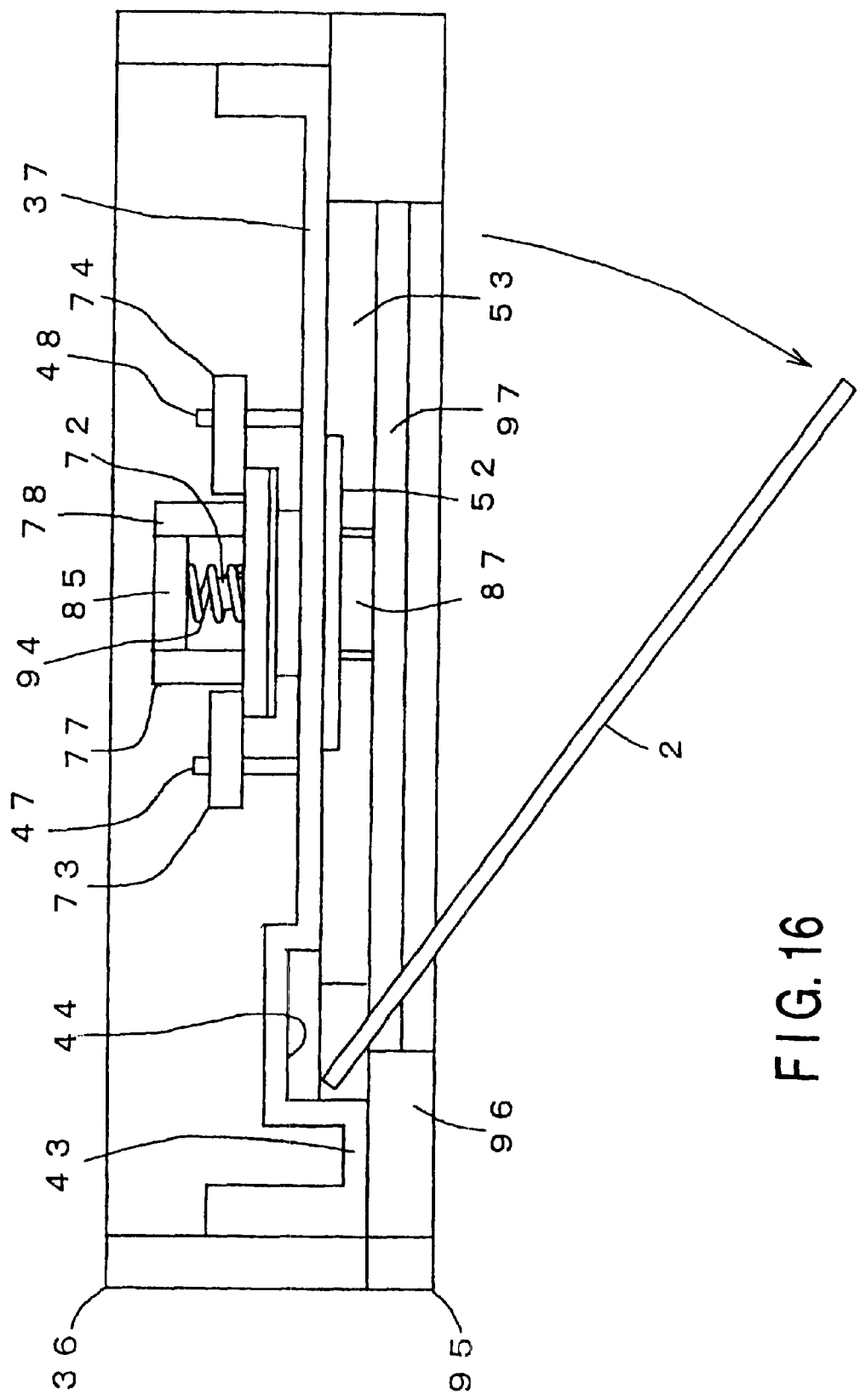
FIG. 16 is a schematic view for explaining the action of the embodiment at the inserting time of a short card-like foreign matter in the IC card processor according to the first embodiment of the present invention.

For this reason, as shown in FIG. 16, the one edge portion side of the foreign matter 2 largely inclines downward, and by this inclination, the other edge portion slips off the rail portion 96 and drops downward.

Incidentally, since the groove 44 which is sunk in the upper surface side of the substrate 37 is provided above the rail portion 96, the foreign matter 2 can be reliably dropped without the rotational movement of the other edge portion side of the foreign matter 2 being regulated.

Figure 17:
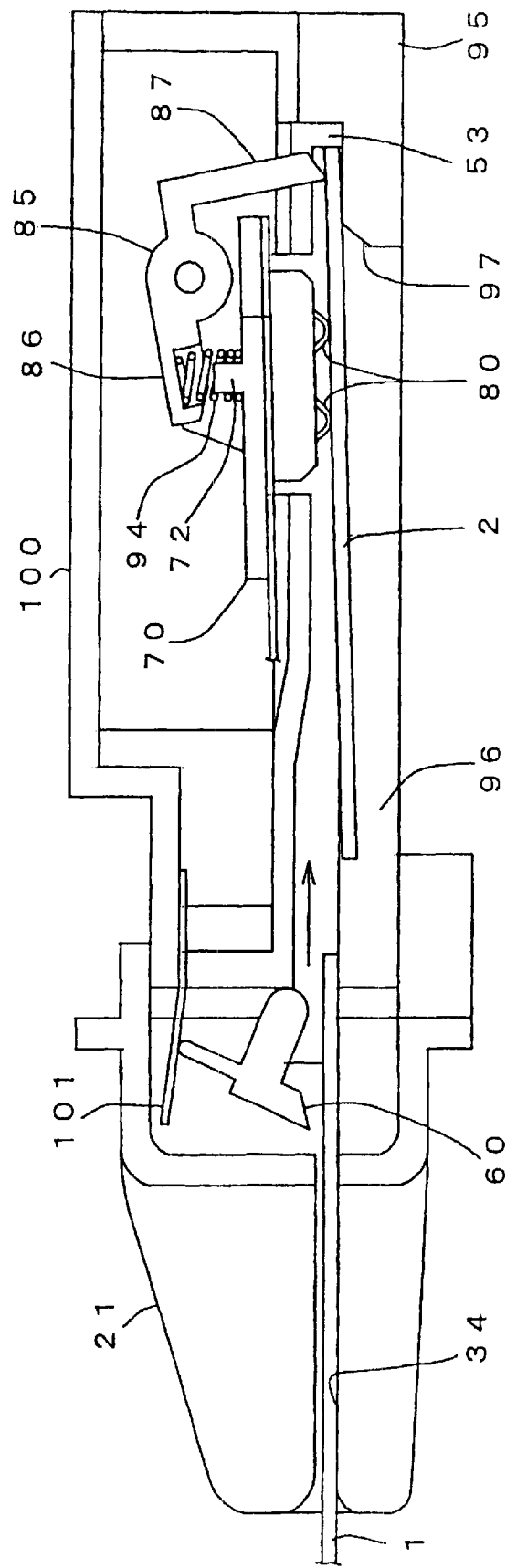
FIG. 17 is a schematic view for explaining the action of the embodiment at a double inserting time of the foreign matter and the regular card in the IC card processor according to the first embodiment of the present invention.
Figure 18:
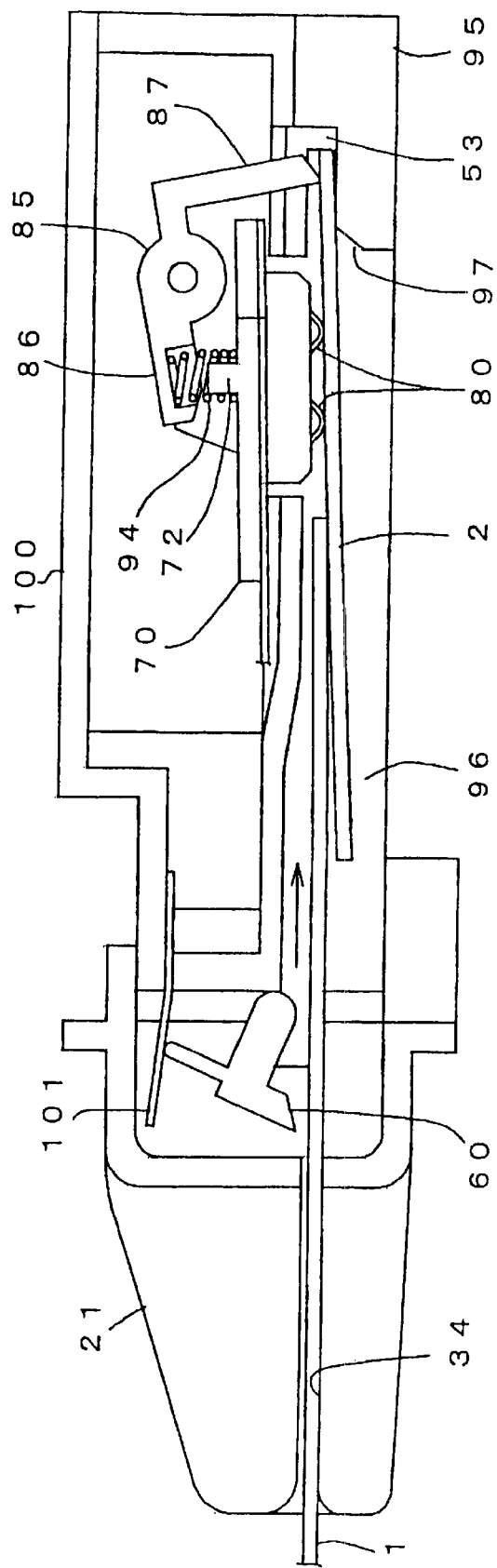
FIG. 18 is a schematic view for explaining the action of the embodiment at the double inserting time of the foreign matter and the regular card in the IC card processor according to the first embodiment of the present invention.

Further, as shown in FIG. 17, when the regular IC card 1 is inserted in a state where the card-like foreign matter 2 intentionally having a short length is inserted to the inner part, as shown in FIG. 18, the IC card 1 advances to a space between the foreign matter 2 and the contact block 70 which allows the contact 80 to contact the foreign matter 2, and its top end abuts against the contact 80.

However, as described above, since the projecting length of the contact 80 is short and its strength is large, it does not suffer an abnormal deformation by the force from the top end of the IC card 1, and transmits the force upward.

For this reason, the coil spring 94 held between the contact block 70 and the first plate portion 86 of the movable member 85 is shrunk so as to move the contact block 70 upward.

Figure 19:
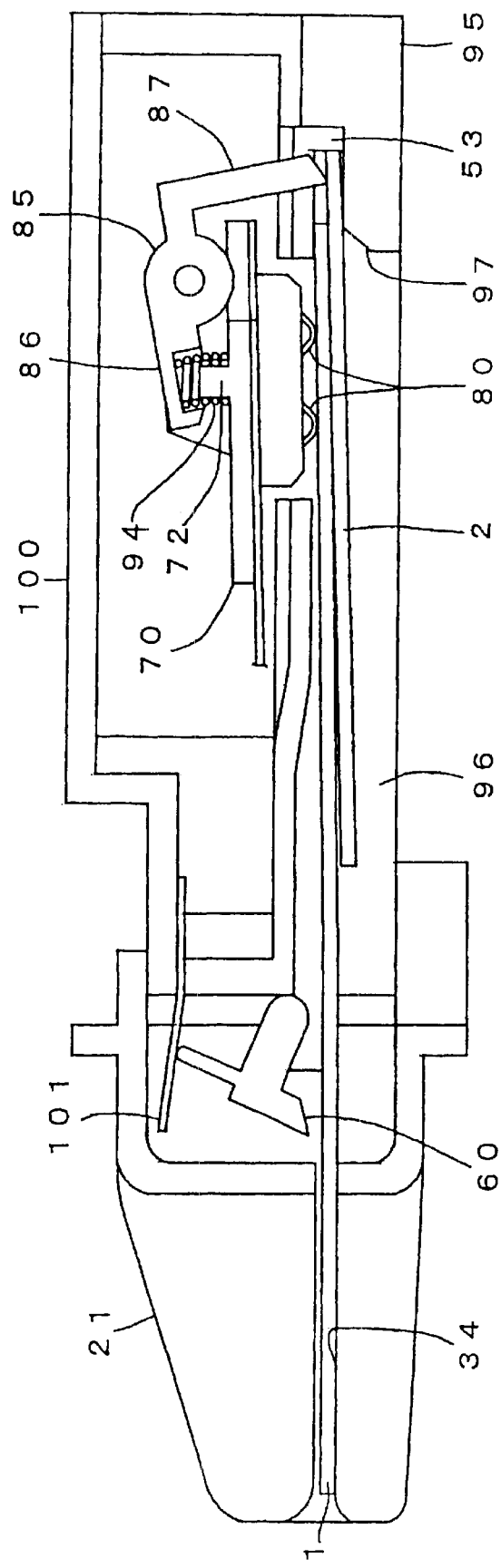
FIG. 19 is a schematic view for explaining the action of the embodiment at the double inserting time of the foreign matter and the regular card in the IC card processor according to the first embodiment of the present invention.
Figure 20:
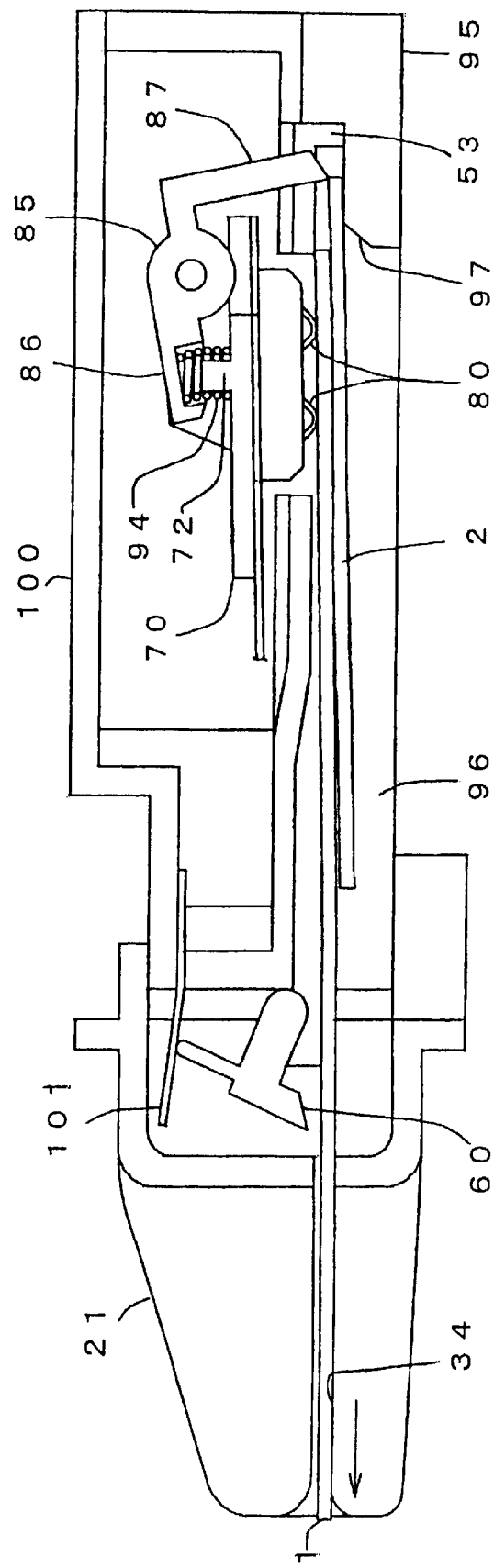
FIG. 20 is a schematic view for explaining the action of the embodiment at the double inserting time of the foreign matter and the regular card in the IC card processor according to the first embodiment of the present invention.

By the upward movement of this contact block 70, the IC card 1 advances to the inner part in a state of being held between the contact 80 and the foreign matter 2 as shown in FIG. 19, and stops at a position where its top end fits into a space between the foreign matter 2 and the under surface of the second regulating portion 52 of the substrate 37 on the guide portion 97 of the rail member 96.

Incidentally, in this state, the information processing is not correctly completed for the foreign matter remained in the inside, and since the contact 80 does not contact a correct position for the terminal of the IC card 1, the information processing for this IC card 1 is not correctly completed.

Accordingly, a person who inserted this IC card determines that the equipment has trouble, and tries to extract the IC card 1.

Figure 21:
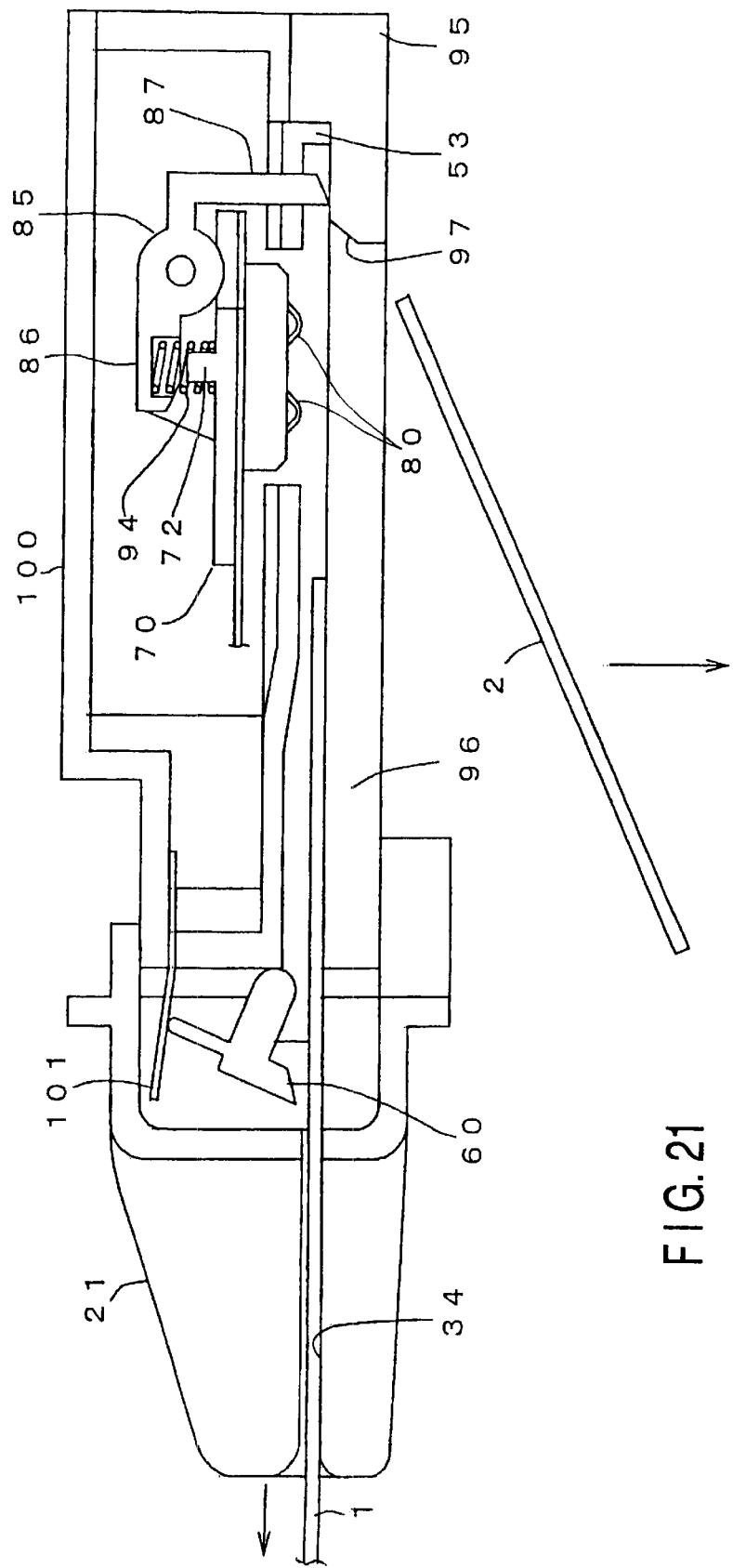
FIG. 21 is a schematic view for explaining the action of the embodiment at the double inserting time of the foreign matter and the regular card in the IC card processor according to the first embodiment of the present invention.

At this time, the top end of the IC card 1 and the top end of the foreign matter 2 are in a state of being strongly fitted into a space between the guide portion 97 and the second regulating portion 52, and by strong frictional force generated between both of them, the foreign matter 2 moves to the card slot 21 side together with the IC card 1, and when its top end passes through the lower end of the second plate portion 87 of the movable member 85, it drops downward as shown in FIG. 21.

In this way, the IC card processor 20 determines that this foreign matter 2 was extracted and makes it possible to deal with the next card.

Accordingly, when the person who extracted the IC card 1 inserts the IC card 1 again, that IC card correctly advances to a predetermined position, and the contact 80 correctly contacts its terminal, thereby making it possible to perform the giving/receiving of the information.

As described above, in the card processor 20 of this embodiment, even when the IC card 1 is inserted in a state where the card-like foreign matter 2 having a length shorter than the regular length is clogged in the inner part, the contact block 70 transmits the inserting force of the IC card to the coil spring 94 so as to elastically deform the coil spring 94, thereby moving the contact block 70 upward to allow the IC card 1 to pass through between the contact 80 and the foreign matter 2.

For this reason, the damage of the contact 80 due to double insertion of the foreign matter 2 and the IC card 1 can be prevented.

Further, even when those having a large strength (rigidity) are used as the contacts 80, since the coil spring 94 as an elastic member collectively applies its elastic recovery force to the central position of the contact group, the center of the swinging of the contact block 70 always becomes a substantially central position of the contact group, and each contact 80 can be allowed to correctly contact the terminal of the IC card 1 by an uniform contact pressure, and the giving/receiving of the information can be stably, and reliably performed even for the IC card having a warp.

Incidentally, in the IC card processor 20, though the coil spring 94 was used as an elastic member, as shown in FIG. 22, the upper end of the projection 72 provided in the central position of the contact group of the contact block 70 may be pressed against the other end side of the plate spring 104 which is fixed to the movable member 85' at one end side thereof.

Further, in the IC card processor 20, though the contact block 70 is moved on one surface side of the IC card so that the contact 80 is brought into contact with the terminal of the IC card, the present invention can be applied also to the IC card processor which allows one surface of the IC card to move to the contact block side.

In this case, as shown in FIG. 23, the coil spring 94 (or the plate spring 104) is provided between a spring bracket 105 fixed to the substrate 37 and the projection 72 of the contact block 70 and the elastic recovery force is collectively applied to the central position of the contract group. Then by an unillustrated movable member, the inserted IC card may be pushed upward from the lower part to the contact block 70 side, thereby allowing the contacts 80 to contact each terminal of the IC card.

As described above, the IC card processor according to the first embodiment of the present invention swingingly supports the contact block provided with a plurality of contacts on one surface side, characterized in that the contact block is relatively brought near one surface side of the IC card received to a predetermined position and each contact of the contact block is brought into contact with each contact point provided on one surface side of the IC card so as to perform the giving/receiving of signals to/from the IC card, the IC processor card comprising an elastic member collectively applying a force for pressing the contact block against one surface side of the IC card on the position corresponding to a substantial center of the contact group of the surface opposite to the surface where the contacts of the contact block are provided, wherein the contact block changes its attitude according to inclination of the IC card with a position to which the pressing force of the elastic member is applied as a supporting point of the swinging, and moves in a separating direction from one surface side of the IC card by elastic deformation of the elastic member which receives a force from one surface side of the IC card.

For this reason, according to the IC card processor according to the first embodiment of the present invention, even when the IC card is inserted in a state where the card-like foreign matter having a length shorter than the regular length is left in a predetermined position, the contact block which received the inserting force of the IC card elastically deforms the elastic member and moves in a direction separating from the foreign matter so as to allow the IC card to pass through between the contact and the foreign matter, and therefore, the damage of the contact can be prevented.

Further, according to the IC card processor according to the first embodiment of the present invention, since the elastic member collectively applies the elastic recovery force to the central position of the contact group of the contact block, the center of the swinging of the contact block always becomes a substantially central position of the contact group, and even when those being large in strength and small in elastic deformation amount are used as contacts, each contact is allowed to correctly contact the terminal of the IC card by an uniform contact pressure and the giving/receiving of the information can be stably and reliably performed even for the IC card having a warp.

Accordingly, according to the first embodiment of the present invention as described above, the IC card processor can be provided, wherein there is no damage due to double insertion of the card-like foreign matter and the IC card, and even when a card having a large warp is inserted, the contact can be allowed to correctly contact the terminal of the IC card by an uniform contact pressure.

(Second Embodiment)

An IC card processor 20 according to a second embodiment adopting the present invention and a constitution of the essential portion thereof and its basic action are the same as the IC card processor 20 according to the first embodiment adopting the present invention as shown in the FIGS. 1 to 16 and the essential portion thereof and its basic action.

Accordingly, here, an action characteristic to the IC card processor 20 according to the second embodiment will be described.

Figure 24:
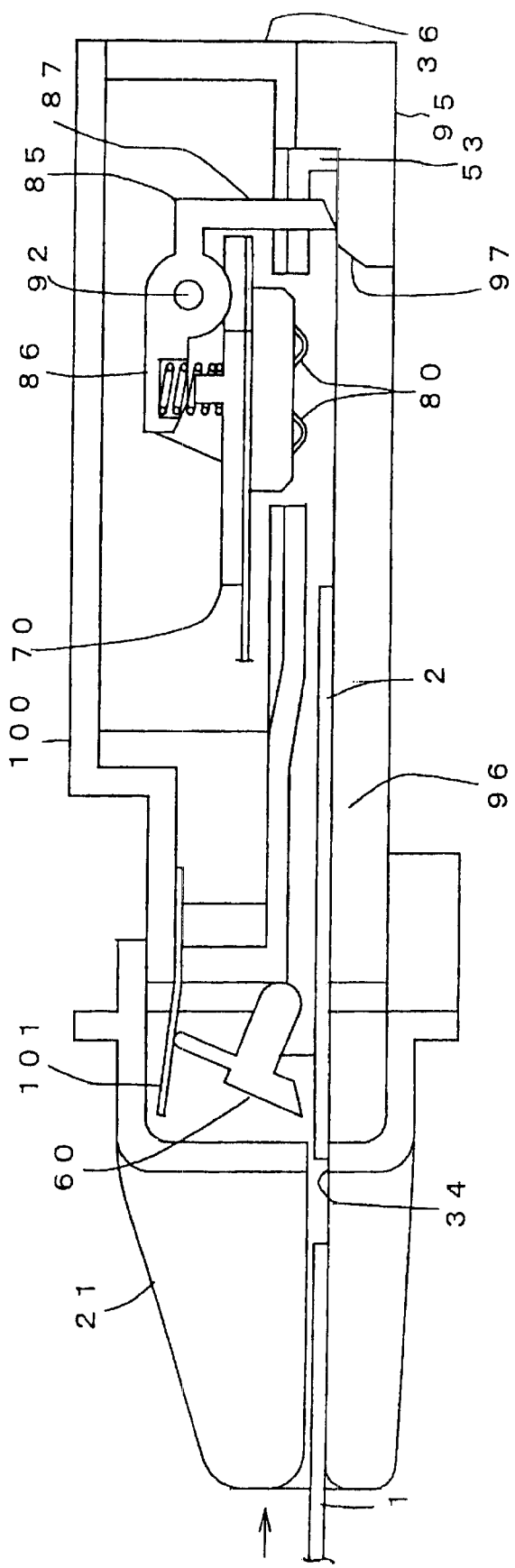
FIG. 24 is a schematic view for explaining the action at double inserting time of a foreign matter and a regular card in an IC card processor according to a second embodiment of the present invention.

That is, as shown in FIG. 24, when the IC card 1 is inserted in a state where the card-like foreign matter having a short length is in a position with its rear end slightly beyond the slit 34, the foreign matter 2 advances into the inner part with its rear end pushed by the IC card, and when its rear end passes through the front end of the substrate 37, the one edge portion 2b descends.

Figure 25:
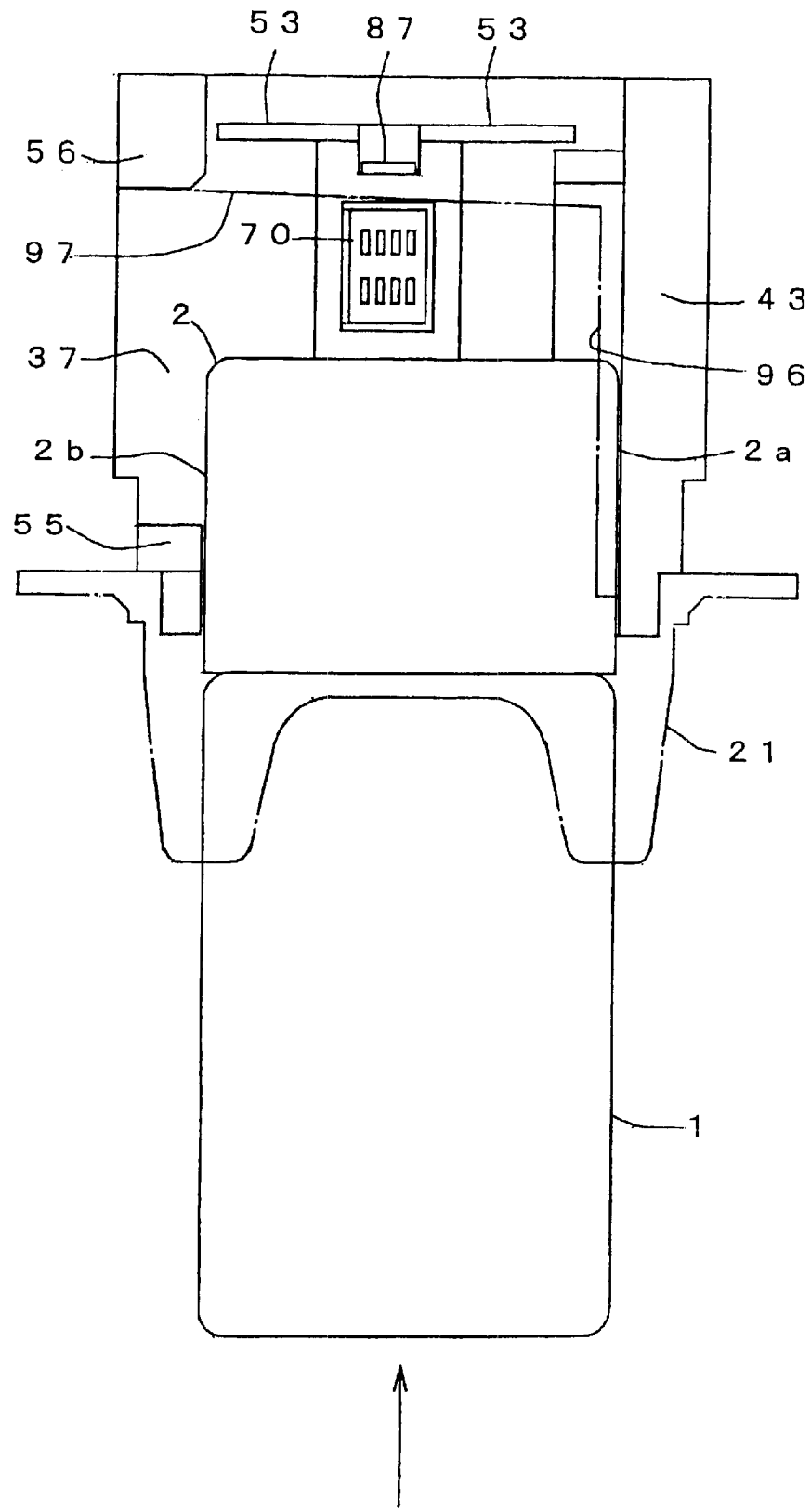
FIG. 25 is a schematic view for explaining the action at the double inserting time of the foreign matter and the regular card in the IC card processor according to the second embodiment of the present invention.

For this reason, as shown in FIG. 25, the foreign matter 2 has one end side of its rear end edge pushed by one end side of the top end edge of the IC card and advances into the inner part.

Here, when the inserting speed of the IC card 1 is low, the edge portion 2a of the foreign matter 2 is slipped off the rail portion 96 and is dropped and discharged as described above before its top end reaches the supporting portion 97.

For this reason, the IC card 1 can be inserted to a predetermined position.

Further, when the inserting speed is high, the foreign matter 2 reaches the supporting portion 97 before its edge portion 2a slips off the rail portion 96.

Figure 26:
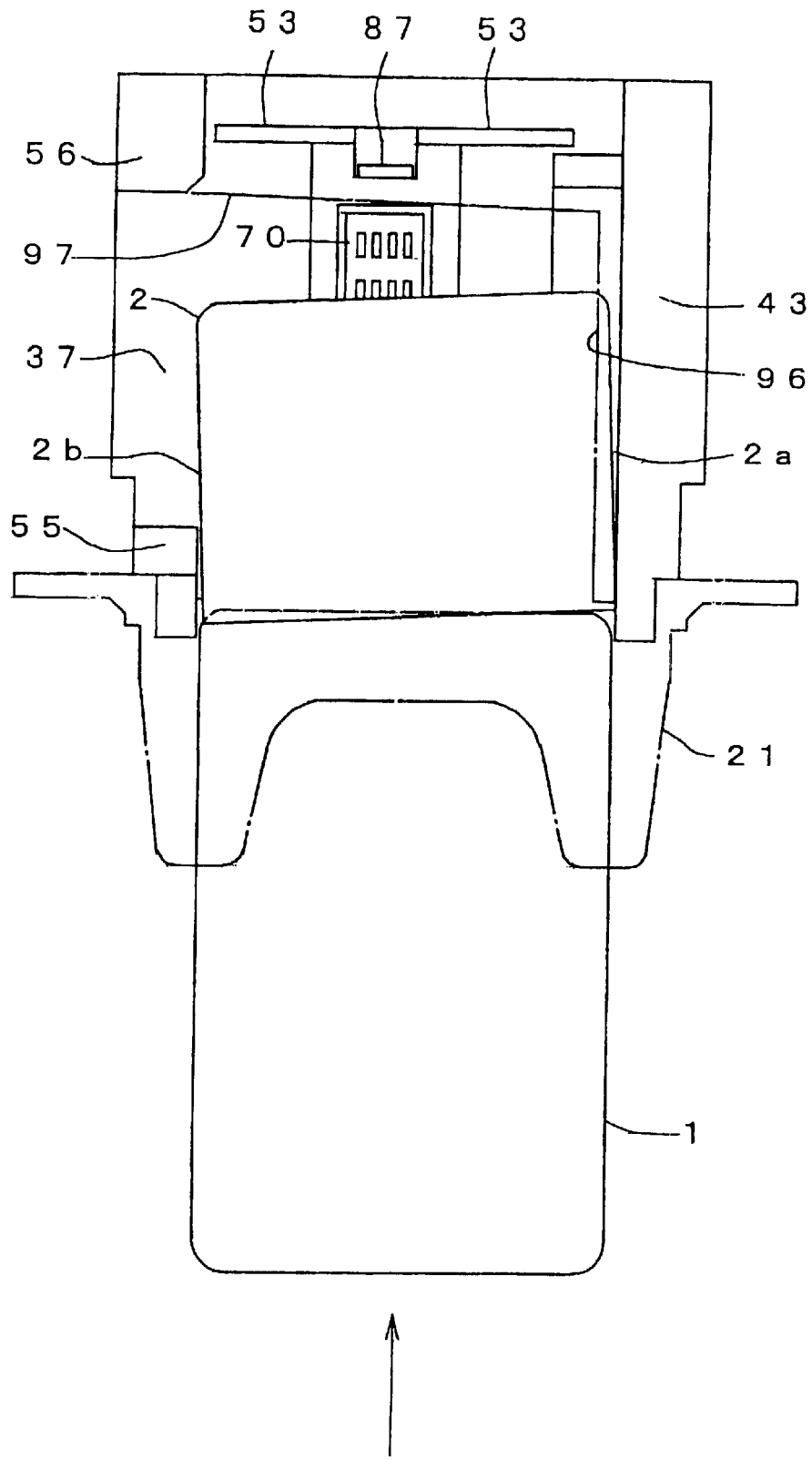
FIG. 26 is a schematic view for explaining the action at the double inserting time of the foreign matter and the regular card in the IC card processor according to the second embodiment of the present invention.

However, at this time, since the foreign matter 2 inclines in such a manner that the its edge portion 2b descends lower than the edge portion 2a of the opposite side, the rear end edge of the foreign matter 2 abuts against the top end edge of the IC card 1 so as to cross each other at the rail portion 96 as shown in FIG. 26.

Figure 27:
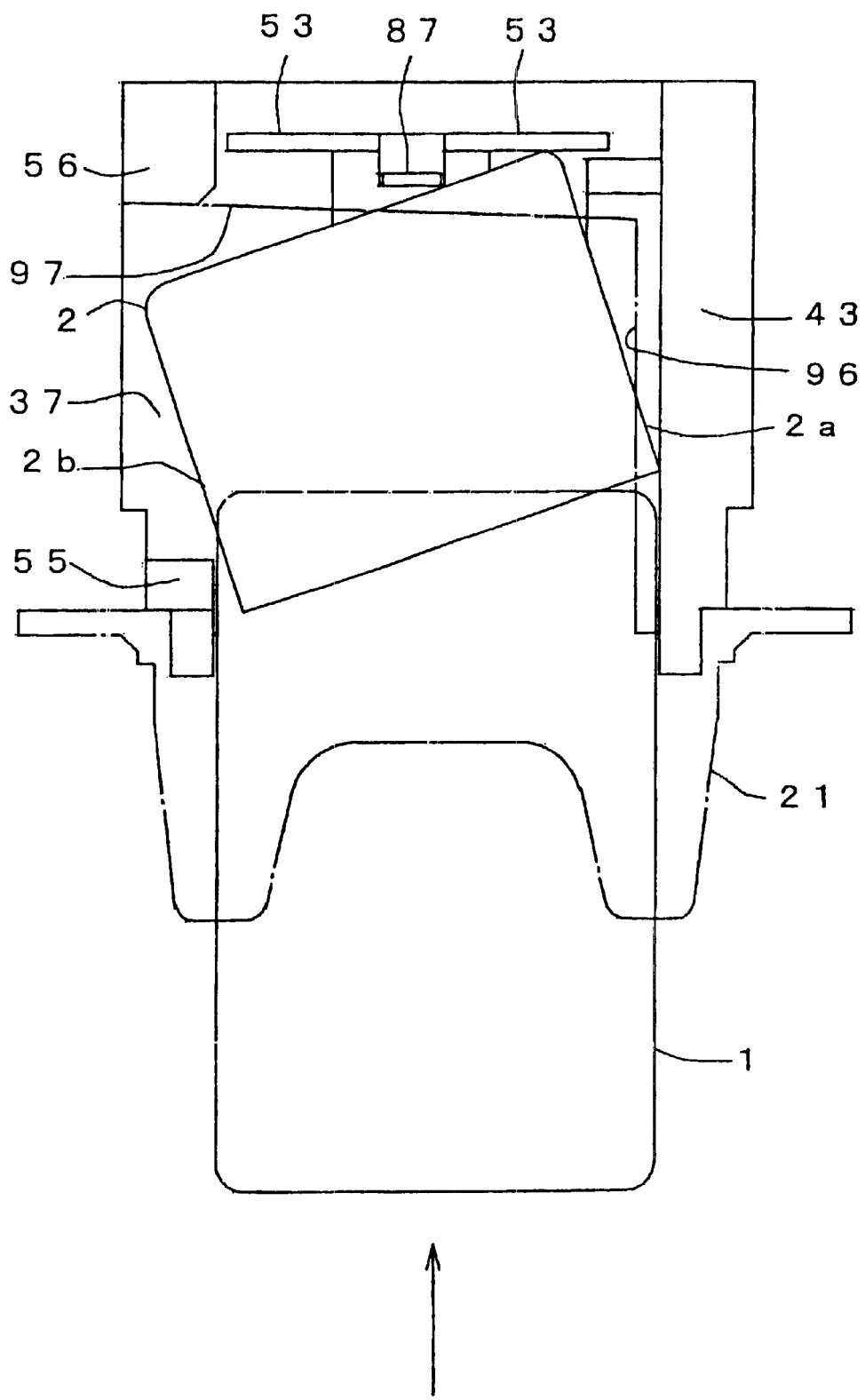
FIG. 27 is a schematic view for explaining the action at the double inserting time of the foreign matter and the regular card in the IC card processor according to the second embodiment of the present invention.

For this reason, as shown in FIG. 26, the foreign matter 2 advances into the inner part, while receiving a clockwise turning force when looked from the under surface side, and when the edge portion of the foreign matter 2 passes through the third regulating portion 55 so that there exists no more lateral regulation for the foreign matter 2, the foreign matter 2 largely turns counter-clockwise as shown in FIG. 27.

As shown in FIG. 27, a corner portion of the top end side of the edge portion 2a abuts against the stopper 53 so as to contact it within the range of a space between the second plate portion 87 of the movable member 85 and the rear end of the first regulating portion 43 and stops in a state where the front portion left side of the IC card 1 superpose on the rear portion left side of the foreign matter 2.

Figure 28:
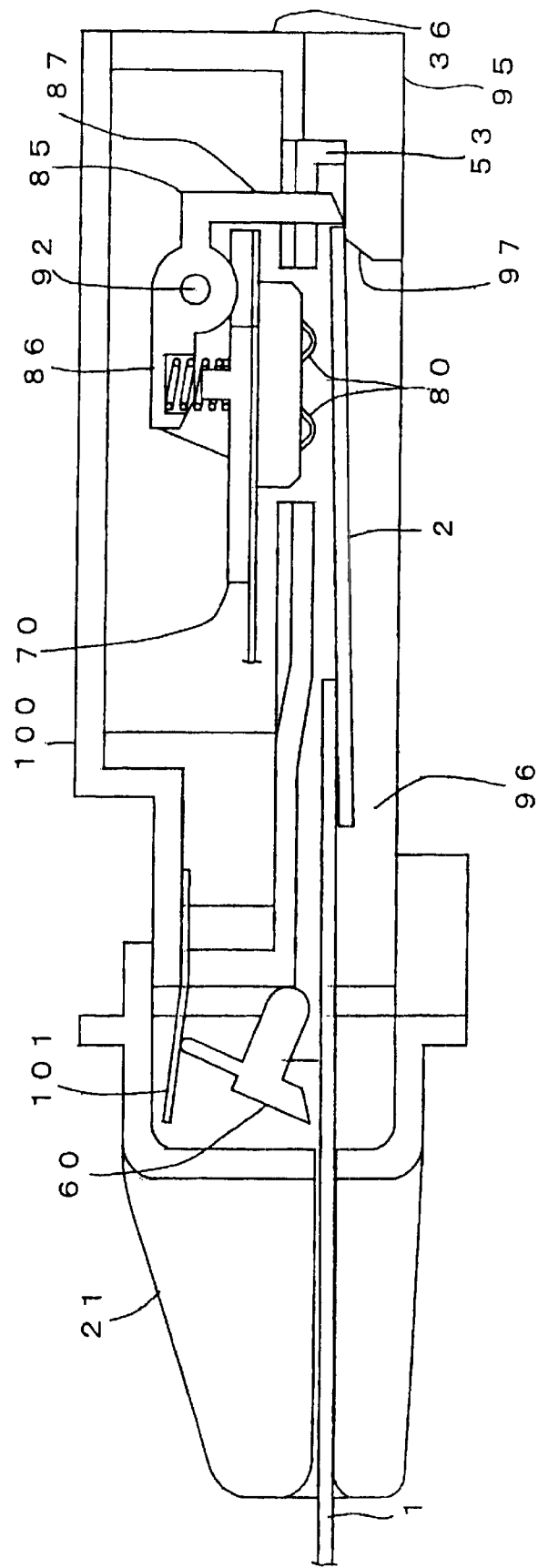
FIG. 28 is a schematic view for explaining the action at the double inserting time of the foreign matter and the regular card in the IC card processor according to the second embodiment of the present invention.

For this reason, this foreign matter 2 either does not abut against the second plate portion 87 of the movable member 85 or cannot sufficiently push through the second plate portion 87 even when abutted against it, and as shown in FIG. 28, the contact block 70 does not descend or the descending amount is little.

Figure 29:
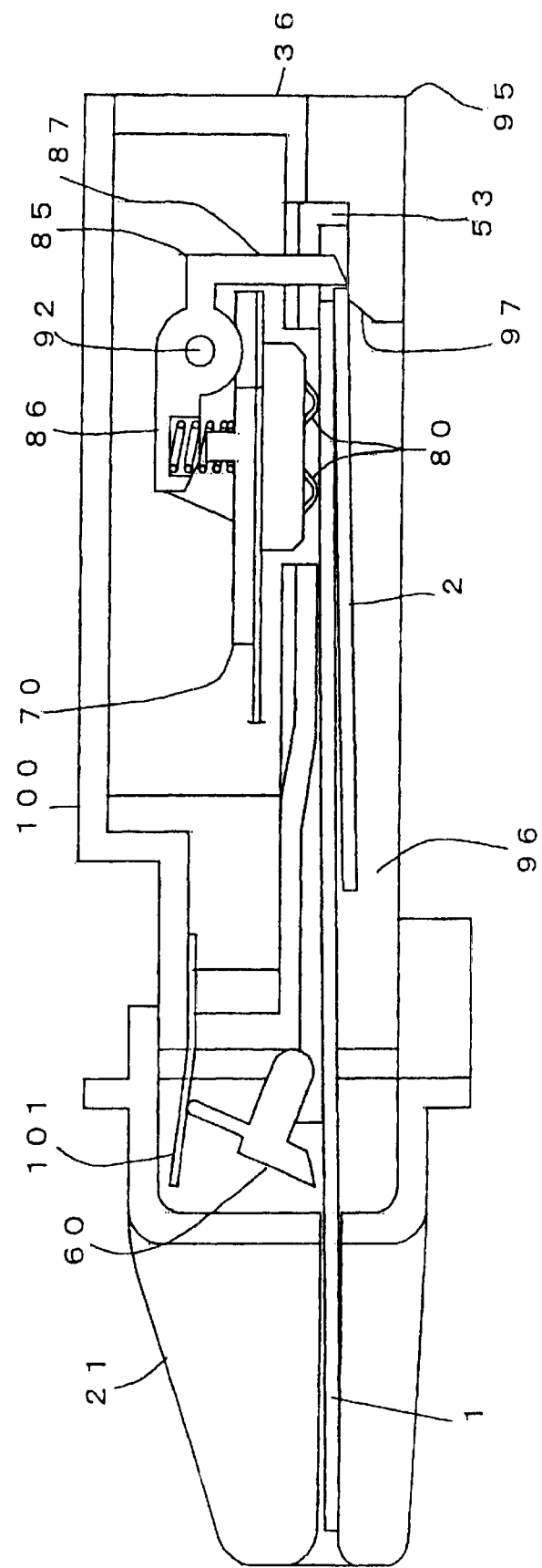
FIG. 29 is a schematic view for explaining the action at the double inserting time of the foreign matter and the regular card in the IC card processor according to the second embodiment of the present invention.

Accordingly, even when the IC card 1 is forcibly inserted in this state, the top end of the IC card passes through between the foreign matter 2 and the contact block 70 without giving a compulsory force to the contact 80 as shown in FIG. 29.

Further, even when the contact block 70 slightly descends, since the contact block 70 which received the inserting force of the IC card 1 transmits its force to the coil spring 94, the coil spring 94 is shrunk, thereby allowing the contact block 70 to move upward and allowing the IC card 1 to pass through without being forced.

The IC card 1 which passed through between the foreign matter 2 and the contact 80 without being forced stops at a position where its top end is fitted into a space between the foreign matter 2 and the under surface of the second regulating portion 52 of the substrate 37 on the upper portion of the regulating portion 97 of the rail member 96 and cannot reach a position which abuts against the second plate portion 87 of the movable member 85.

Accordingly, this IC card 1 cannot be utilized and a person who inserted this IC card 1 is obliged to extract it.

Figure 30:
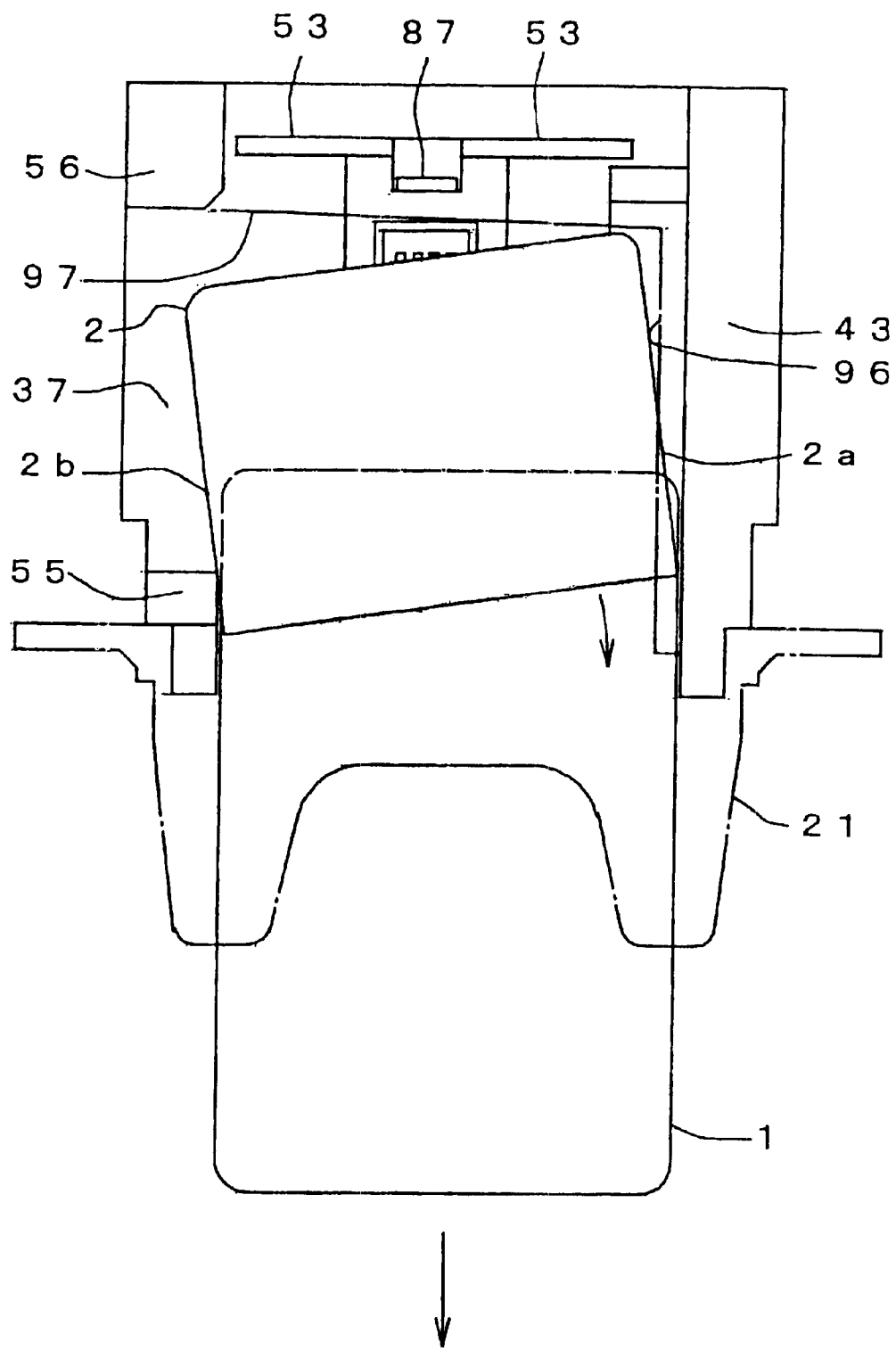
FIG. 30 is a schematic view for explaining the action at the double inserting time of the foreign matter and the regular card in the IC card processor according to the second embodiment of the present invention.

At this time, the top end of the IC card 1 and the top end of the foreign matter 2 are in a state of being strongly fitted into a space between the guide portion 97 and the second regulating portion 52, and by a strong frictional force generated between both of them, the foreign matter 2 moves to the card slot 21 side together with the IC card 1, and as shown in FIG. 30, when the edge portion 2b of the foreign matter 2 abuts against a corner of the third regulating portion 55 and turns clockwise with this abutting place as a supporting point to restore its attitude and its top end side slips off from above the supporting portion 97, the support from the lower part is only by the rail portion 96 so that it drops downward.

Accordingly, when the person who extracted the IC card 1 inserts the IC card 1 again, that IC card 1 correctly advances to a predetermined position, and the contact 80 correctly contacts its terminal, thereby making it possible to perform the giving/receiving of the information.

As described above, in the card processor 20 according to this second embodiment, the one side of a pair of lateral regulating portions for regulating the lateral movement of the card is formed by the third regulating portion 55 provided in the front end portion of the substrate 37 and a fourth regulating portion 56 provided in the rear end portion, and a space between the third regulating portion 55 and the fourth regulating portion 56 is opened toward the side.

For this reason, when the card-like foreign matter 2 having a length shorter than the regular length is pushed through by the IC card 1, the foreign matter 2 is turned by utilizing the opening portion between the third regulation portion 55 and the fourth regulating portion 56, so that the abutting against the movable member 85 of the foreign matter 2 can be avoided, and the descending of the contact 80 by the foreign matter 2 can be prevented and the damage of the contact 80 by the IC card 1 inserted subsequent to the foreign matter 2 can be prevented.

Incidentally, in the IC card processor 20, the movable member 85 as a detection member for detecting the insertion of the IC card is set to receive the inserting force of the IC card at a position after the contact group.

However, this does not limit the present invention, and the detection member may detect the IC card within the range of a space between the contact group and the stopper 53, and within the range from the rear position of the contact group from the fourth regulating portion 56.

By so doing, the card-like foreign matter is detected by the detection member so that the descending of the contact can be prevented.

Further, though the embodiment mechanically detects the advancement of the IC card to the vicinity of a predetermined position by the movable member 85, the IC card processor can similarly adopt the present invention, which detects the advancement of the IC card to the vicinity of a predetermined position by using an electrical sensor such as a switch and the like as a detection member or an optical sensor such as an photo coupler and the like, and by that detection signal, drives a motor, a plunger and the like so as to move the contact block 70 to one surface side of the IC card.

Further, though the embodiment was constituted in such a manner that the space between the third regulating portion 55 and the fourth regulating portion 56 is opened toward the side, if the distance from the wall surface of the first regulating portion 43 between the third regulating portion 55 and the fourth regulating portion 56 is taken sufficiently wide for the lateral dimension of the IC card so that the card-like foreign matter can turn on a substantially horizontal surface, the side between the third regulating portion 55 and the fourth regulating portion 56 can be closed by a wall member.

As described above, the IC card processor according to the second embodiment comprises: a substantially rectangular substrate; a pair of lateral movement regulating portions projectingly provided so as to mutually oppose on the under surface both sides of the substrate, which regulates the lateral movement of the IC card inserted from their front end sides along the under surface of the substrate from both sides by the wall surfaces mutually opposed; a rail portion provided along the under edge of the one lateral regulating portion, which regulates the downward movement of the one lateral edge portion of the IC card; a stopper provided at the rear end side of the under surface of the substrate, which abuts against the top end of the IC card advancing in a state where the lateral movement is regulated by the lateral regulating portion, and the downward movement of the one lateral edge portion is regulated by the rail portion, and stops the IC card at a predetermined position; a contact block which is vertically movably supported against the substrate at a position further onward than the stopper; and a detection member which detects the insertion of the IC card within the range between the plurality of contacts and the stopper, characterized in that the contact block is moved to one surface side of the IC card detected by the detection member and advanced to the predetermined position so that the plurality of contacts are brought into contact with the terminals of the IC card and the giving/receiving of the information to/from the IC card is performed, wherein the one lateral regulating portion is formed continuously from the front end of the substrate to the vicinity of the stopper, and the other lateral regulating portion comprises the first regulating portion provided in the vicinity of the front end of the substrate and the second regulating portion provided in the vicinity of the stopper, and the space between the first and second regulating portions is opened toward the side or the distance from the wall surface of the one lateral regulating portion is taken sufficiently wide for the lateral dimension of the IC card, and at the same time, the detection member detects the insertion of the IC card within the space from the rear position of the plurality of contacts group to the second regulating portion of the other lateral regulating portion.

For this reason, according to the IC card processor according to the second embodiment of the present invention, when the card-like foreign matter having a length shorter than the regular length is pushed through by the IC card, the foreign matter is turned by a portion between the first regulating portion of the other lateral regulation portion and the second regulating portion so as to avoid a card detection by the detection member and prevent the descending of the contact to the foreign matter and the damage of the contact by the inserted IC card can be prevented.

Accordingly, according to the second embodiment of the present invention as described above, the IC card processor capable of preventing the damage of the contact due to double insertion of the card-like foreign matter and the IC card can be provided.

(Third Embodiment)

An IC card processor 20 according to a third embodiment adopting the present invention and a constitution of the essential portion thereof and its basic action are the same as the IC card processor 20 according to the first and second embodiments adopting the present invention as shown in the FIGS. 1 to 16 and FIGS. 24 to 30 and the essential portions thereof and their basic actions.

Accordingly, here, an action characteristic to the IC card processor 20 according to the third embodiment will be described.

Figure 31:
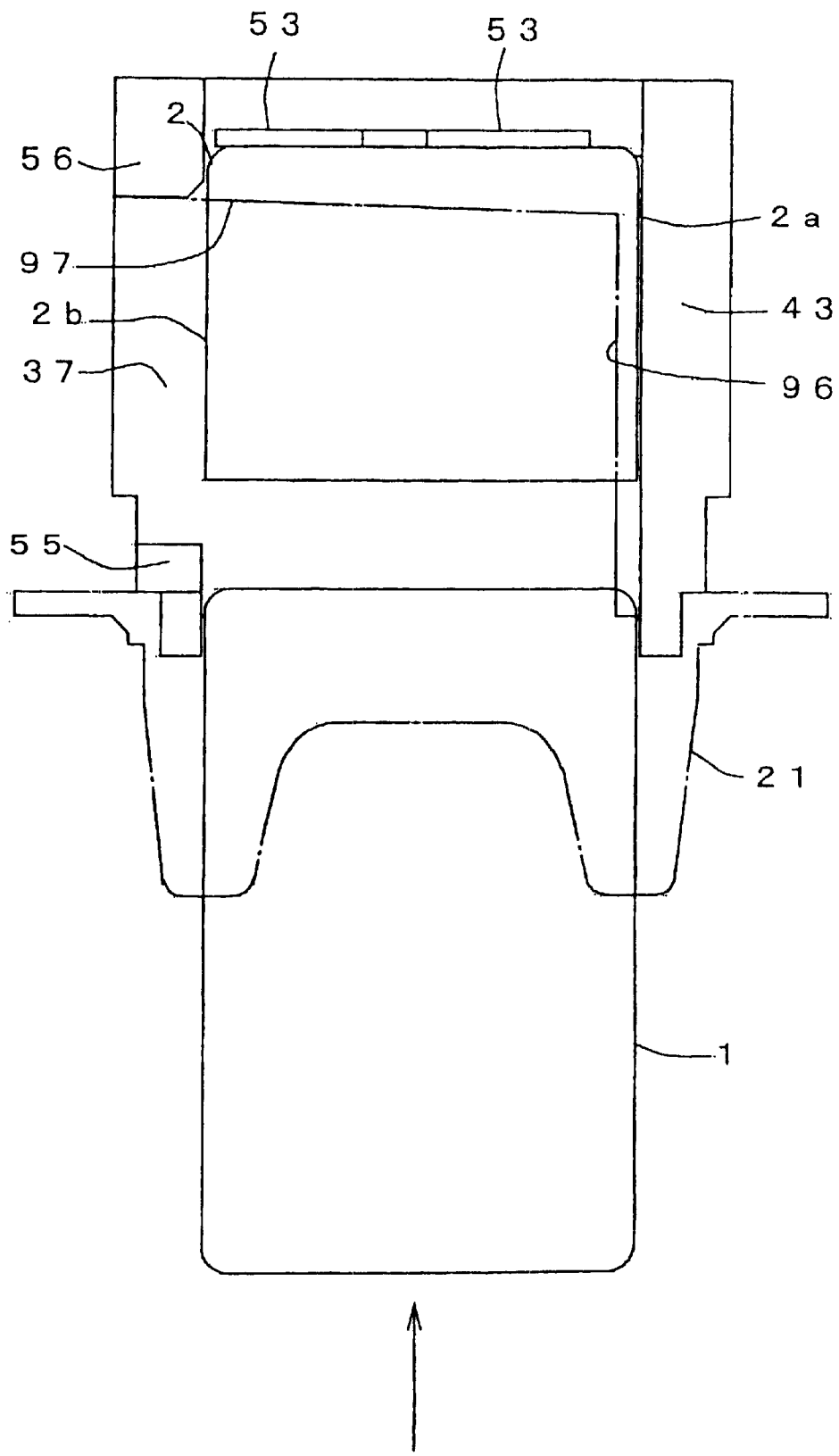
FIG. 31 is a schematic view for explaining the action in the case where a regular card is inserted when a foreign mater exists inside in an IC card processor according to a third embodiment of the present invention.
Figure 32:
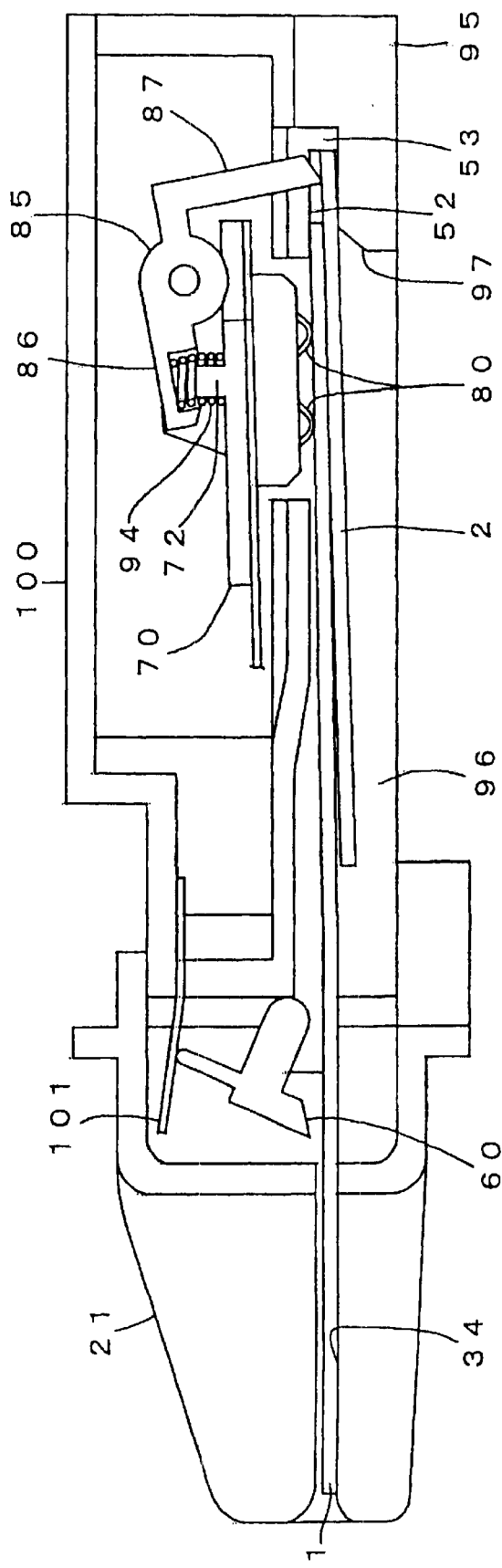
FIG. 32 is a schematic view for explaining the action in the case where the regular card is inserted when the foreign mater exists inside in the IC card processor according to a third embodiment of the present invention.
Figure 33A:
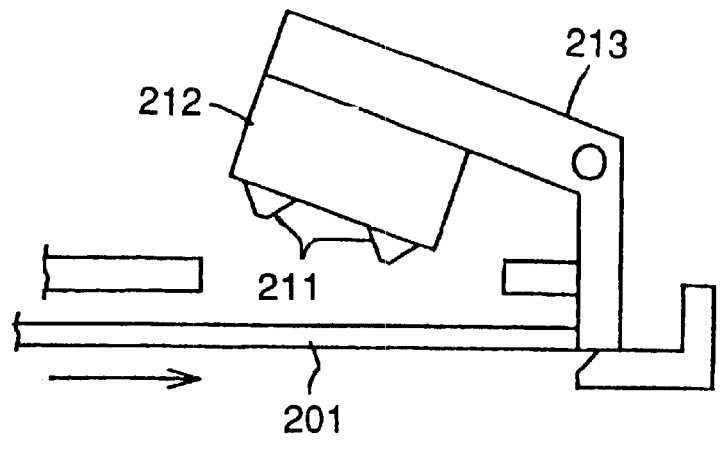
FIGS. 33A, 33B, and 33C are schematic views of a conventional IC card processor.
Figure 33B:
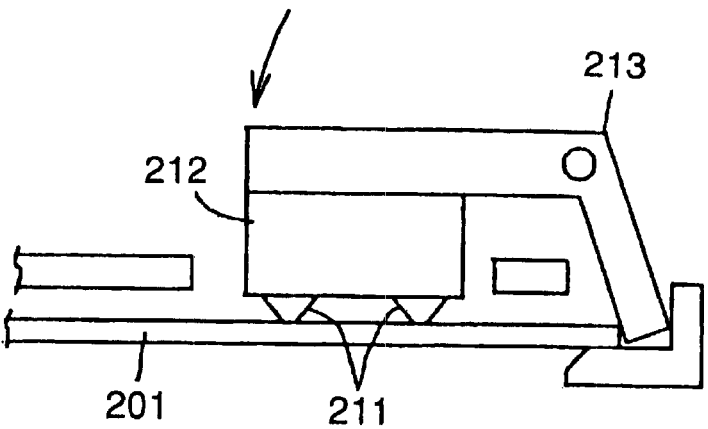
Figure 33C:
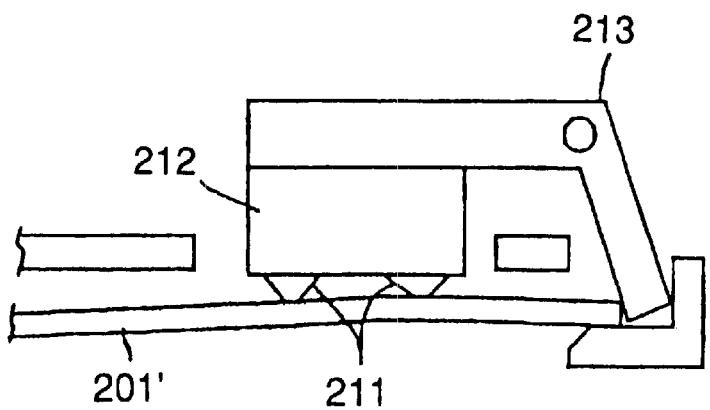
Figure 34A:
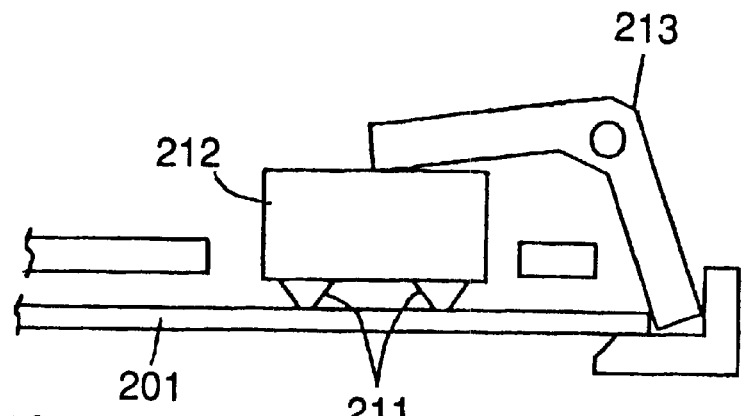
FIGS. 34A and 34B are schematic views of the conventional IC card processor.
Figure 34B:
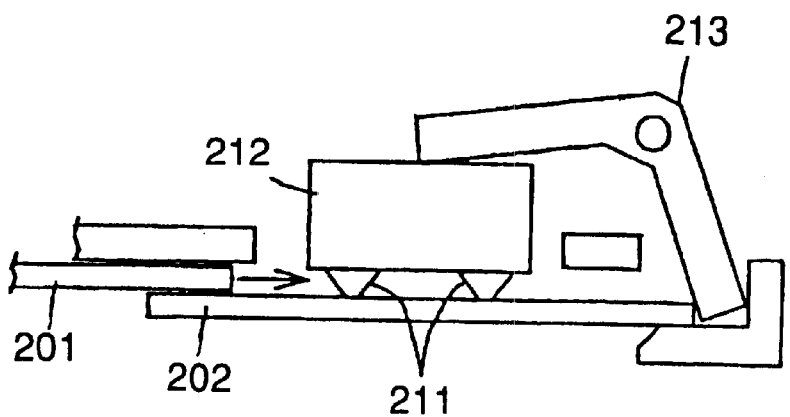
Figure 35:
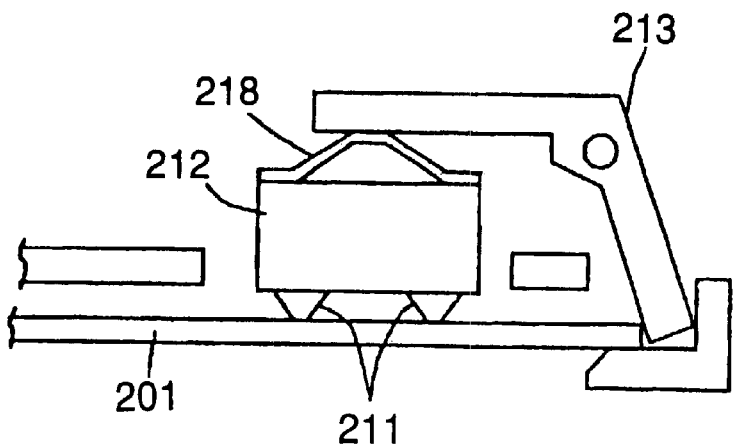
FIG. 35 is a schematic view of the conventional IC card processor.
Figure 36:
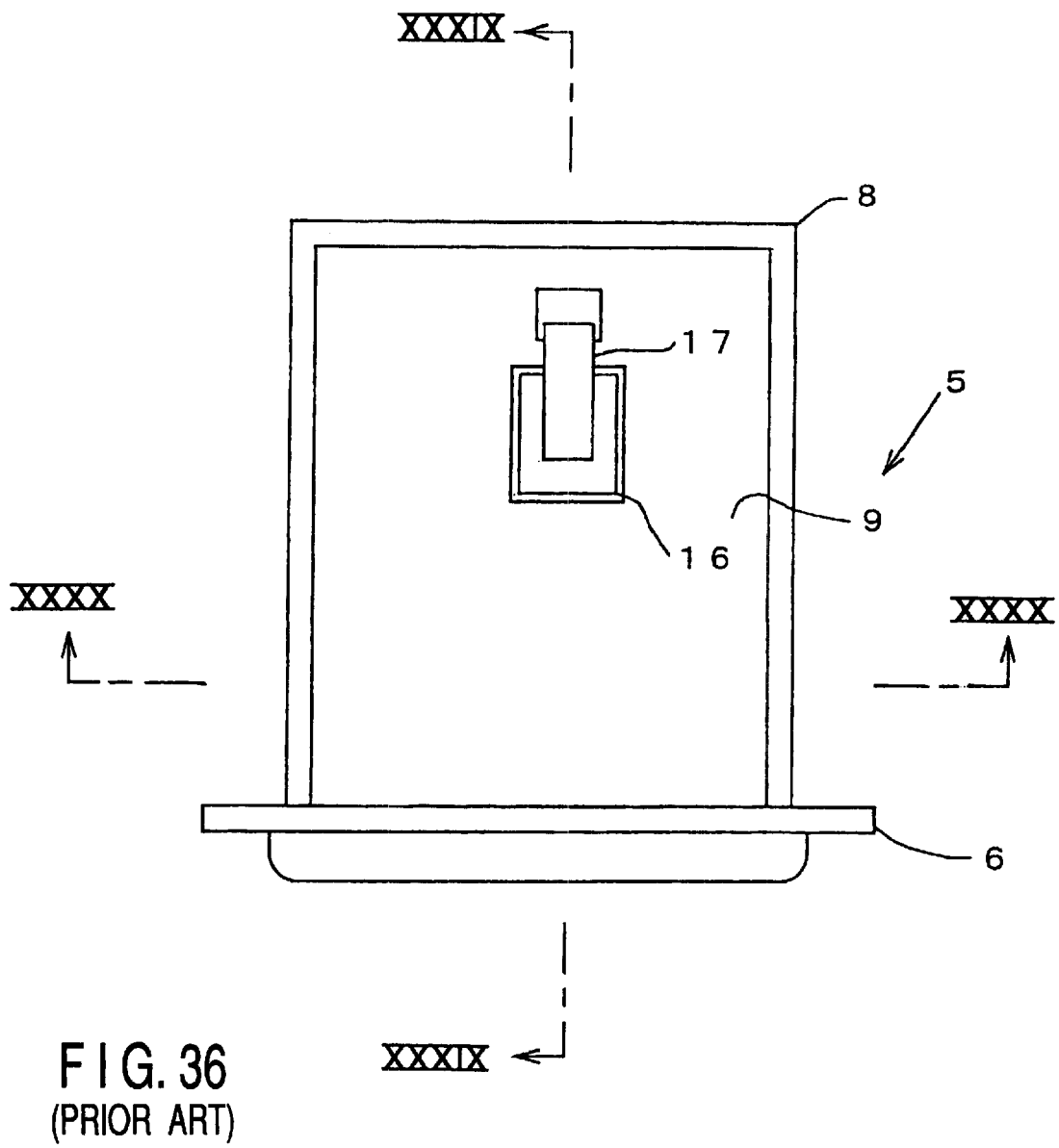
FIG. 36 is a schematic plane view of the conventional IC card processor.
Figure 37:
FIG. 37 is a schematic front view of the conventional IC card processor.
Figure 38:
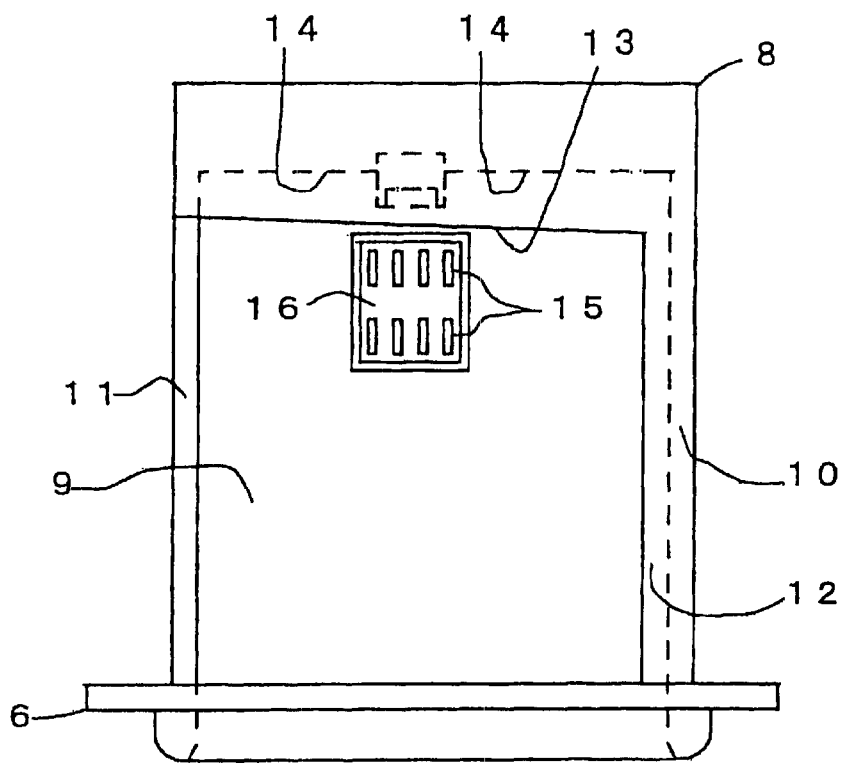
FIG. 38 is a schematic bottom view of the conventional IC card processor.
Figure 39:
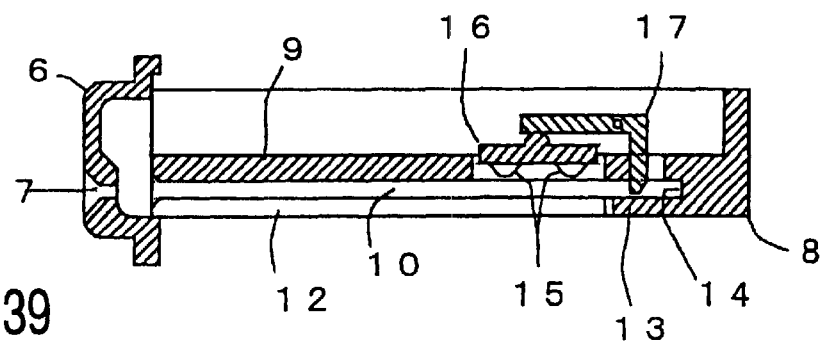
FIG. 39 is a sectional view taken along the XXXX IX–XXX IX line in FIG. 36.
Figure 40:
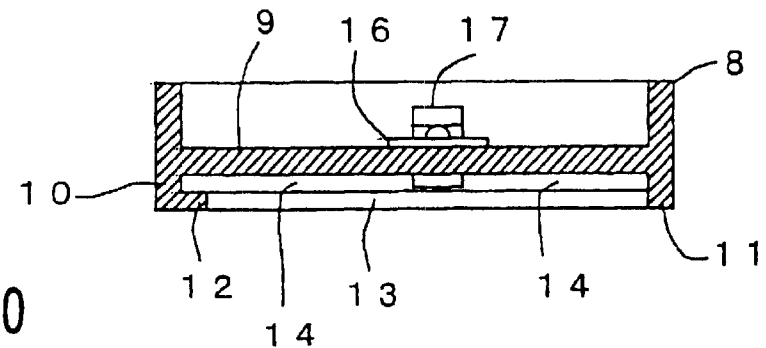
FIG. 40 is a sectional view taken along the —XXXX line in FIG. 36.
Figure 43:
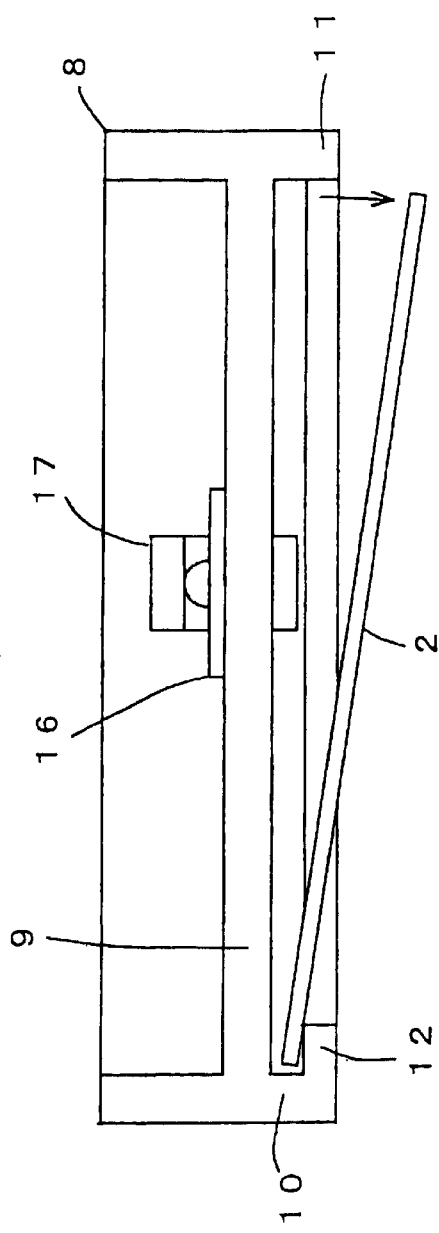
FIG. 43 is a schematic view for explaining the action at the inserting time of the short card-like foreign matter in the conventional IC card processor.
Figure 44A:
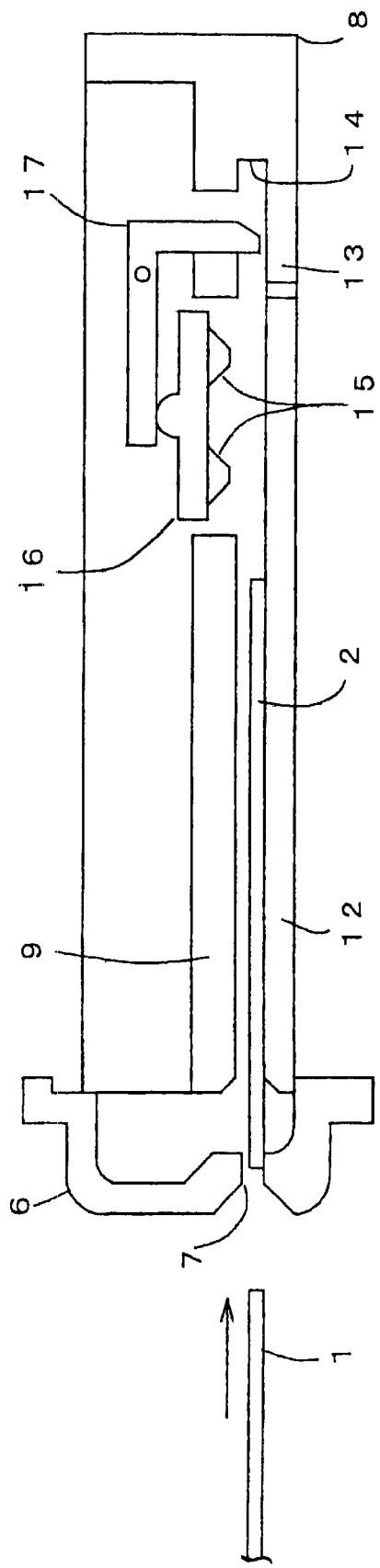
FIGS. 44A, 44B and 44C are schematic views for explaining the action at the double inserting time in the case where the regular card is inserted when the foreign matter exists inside in the conventional IC card processor.
Figure 44B:
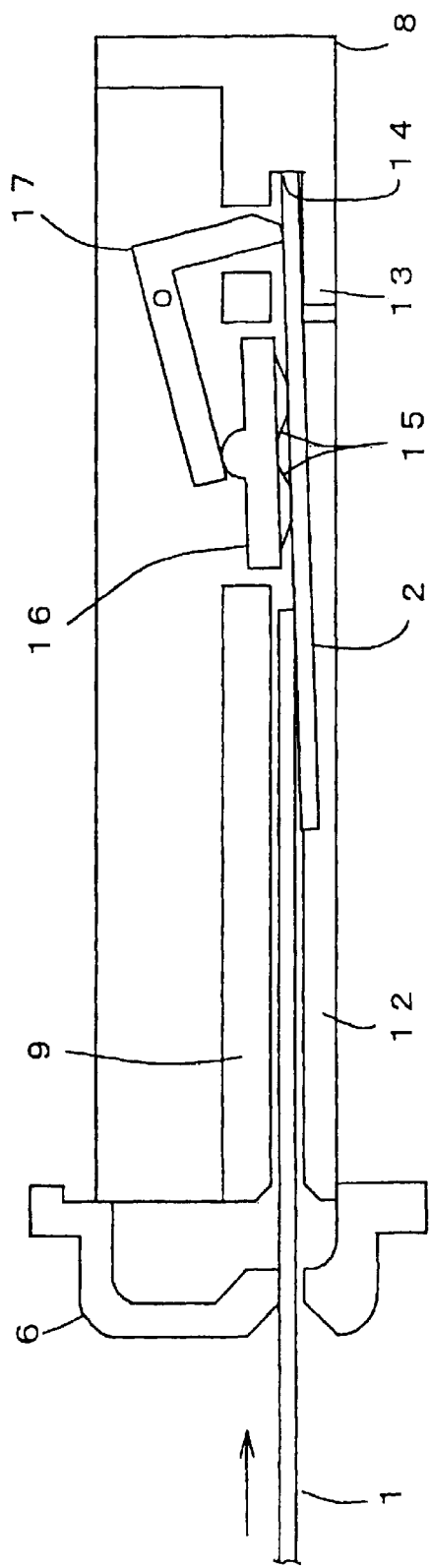
Figure 44C:
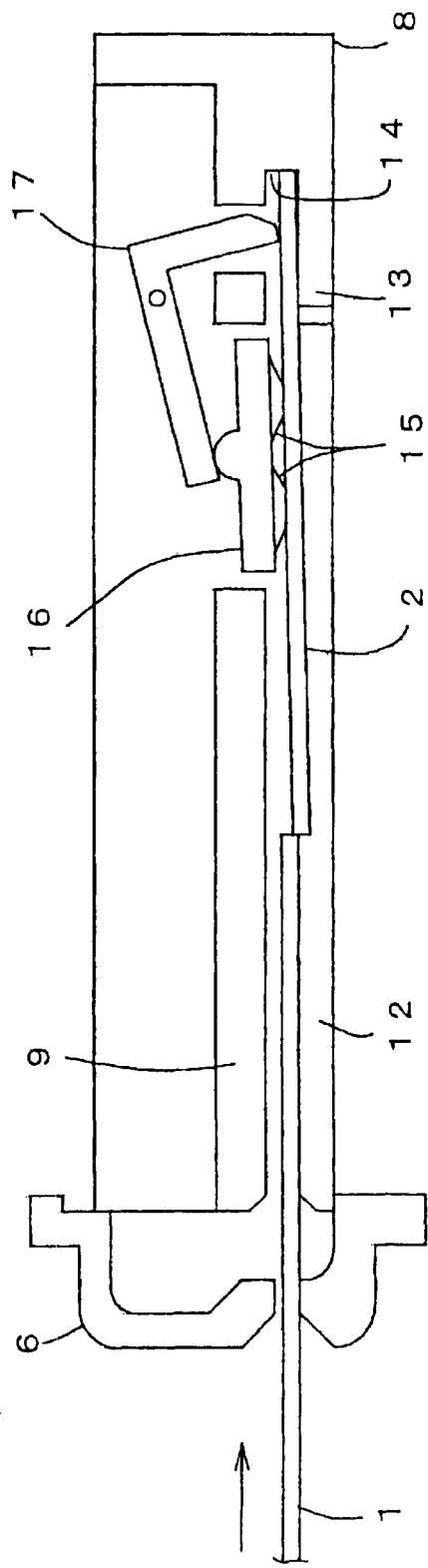

That is, as shown in FIG. 31, even when the IC card 1 is inserted in a state where the foreign matter 2 is inserted to a predetermined position by whatever method it is and the contact 80 contacts the foreign matter 2, by strongly pushing the IC card as shown in FIG. 32, its one edge portion 1a side superposes on the edge portion 2 of the foreign matter 2 so as to enter between the rail portion 97 and the escaping groove 44, and its top end passes through between the foreign matter 2 and the contact 80 and reaches on the supporting portion 97 and stops by strongly fitting between the supporting portion 97 and the second regulating portion 52.

When the IC card 1 is extracted in this state, similarly as described above, by strong frictional force generated between the IC card 1 and the foreign matter 2, the foreign matter 2 moves to the card slot 21 side together with the IC card 1, and when its edge portion slips off above the supporting portion 97, the support from the lower part is only by the rail portion 96 so that this foreign matter 2 drops downward.

In this way, even when the card-like foreign matter having a short length is in a state of advancing to the inner part in advance, by once strongly pushing the IC card 1 and then extracting it, the foreign matter 2 can be dropped and discharged.

Furthermore, since the operation for once strongly pushing the IC card and then extracting it is an usual operation performed by the user of the equipment, the extracting operation of the foreign matter 2 can be performed by the equipment user without being conscious of it, and a maintenance operation for the clogging of the foreign matter by personnel can be exceptionally reduced.

Incidentally, though this IC card processor 20 is constituted in such a manner that, by utilizing a space between the third regulating portion 55 as the one lateral regulating portion and the fourth regulating portion 56, the foreign matter 2 is turned, the card processor where the third regulating portion 55 and the fourth regulating portion 56 are continuous can similarly adopt the present invention.

In this way, in the card processor 20 according to the third embodiment, when the IC card 1 is inserted in a state where the card-like foreign matter 2 having a length larger than the regular length is inside, by receiving the IC card 1 so as to be superposed on the upper surface side of the foreign matter 2, the top end portions of the IC card 1 and the foreign matter 2 stop the advancement of the IC card 1 in a state of fitting between the supporting portion 97 and the second regulating portion 52, and by frictional force with the IC card 1, when the IC card 1 is extracted, the foreign matter 2 is brought back to the front end side of the substrate 37 and dropped and discharged, and therefore, by an extremely simple operation of extracting the IC card, the foreign matter 2 can be removed.

As described above, the IC card processor according to the third embodiment comprises: a substantially rectangular substrate; a pair of lateral movement regulating portions projectingly provided so as to mutually oppose on the under surface both sides of the substrate, which regulates the lateral movement of the IC card inserted from their front end sides along the under surface of the substrate from both sides by the wall surfaces mutually opposed; an upward regulating portion formed at the under surface side of the substrate, and between the one pair of lateral regulating portions and regulates the upward movement of the IC card at the under surface; a rail portion provided along the under edge of the one lateral regulating portion, which supports the one lateral edge portion of the IC card at the upper surface and regulates the downward movement thereof; a stopper provided at the rear end side of the under surface of the substrate, which abuts against the top end of the IC card advancing in a state where the lateral movement is regulated by the lateral regulating portion, and an up and down movement is regulated by the upward regulating portion and the rail portion, and stops the IC card at a predetermined position; and a supporting portion which guides the stopper in a state where the top end of the IC card is supported at the upper surface in the vicinity of the stopper and the downward movement is regulated; wherein a plurality of contacts are allowed to contact the contact points provided in one surface side of the IC card advanced to the predetermined position and the giving/receiving of the information to/from the IC card is performed; and wherein the upper surfaces of the rail portion and the supporting portion are provided in a position higher than a thickness of one piece of the IC card and less than a thickness of two pieces of the IC card, and a height from above the rail portion larger than a thickness of two pieces of the IC card and a space wider than the upper surface of the rail portion are formed on the portion opposed to the upper surface of the rail portion within the substrates so as to provide an escaping portion to allow the edge portion of the card body having a thickness of two pieces of the IC card to pass through the upper surface of the rail portion.

For this reason, according to the IC card processor according to the third embodiment of the present invention, even in a state where the card-like foreign matter having a length shorter than the regular length is inside, by once strongly extracting the IC card, the foreign matter can be dropped and discharged so that the foreign matter can be removed without performing a complicated operation.

Accordingly, according to the third embodiment of the present invention, the IC card processor capable of easily removing the card-like foreign matter existing inside can be provided.

What is claimed is:

1. An IC card processor comprising:
   a card slot defining a space in which an IC card is received;
   a contact block having a plurality of contacts on a first surface which respectively contact a plurality of contact points provided on a first surface of the IC card received in said card slot;
   a supporting mechanism which movably supports said contact block in a vertical direction with respect to said first surface of the IC card received in said card slot, in a manner such that said contact block is swingable around a first axis line which passes a center of said plurality of contacts of said contact block in an inserting direction of said IC card, and such that said contact block is swingable around a second axis line which passes the center of said plurality of contacts of said contact block in a lateral direction of said IC card; and
   an elastic member which abuts against said contact block at only one point and which applies a pressing force to press said plurality of contacts of said contact block on said first surface of said IC card,
   wherein the pressing force is applied by said elastic member to a point which exists on an axis line which passes a cross point of said first axis line and said second axis line and extends vertically;
   wherein said contact block changes attitude according to an inclination of said IC card with respect to the point to which the pressing force of said elastic member is applied as a supporting point for swinging, and said contact block is set to be movable in a separating direction from said first surface of said IC card by elastic deformation of said elastic member which receives a force from said first surface of said IC card;
   wherein said supporting mechanism includes a movable member having a first end side which receives an inserting force of said IC card, and said supporting mechanism brings a second end side of said movable member near a second surface of said contact block;
   said elastic member is provided between the second end side of said movable member and a position on said second surface of said contact block corresponding to a substantial center of said plurality of contacts of said contact block; and
   wherein said plurality of contacts of said contact block absorb the inserting force of said IC card by adding an elastic deformation amount of said elastic member, and said plurality of contacts have an elastic deformation amount sufficient enough to provide a pressing force with a predetermined attitude adjustment range at each contact point which is provided on said first surface of said IC card.

2. The IC card processor according to claim 1, wherein said elastic member comprises a coil spring which is elastically provided between the second end side of said movable member and the position on said second surface of said contact block corresponding to the substantial center of said plurality of contacts of said contact block.

3. The IC card processor according to claim 1, wherein said elastic member comprises a plate spring whose first end side is fixed to said movable member and whose second end side presses against a top end of a projection which is provided upright at a substantially central position on said second surface of said contact block corresponding to the substantial center of said plurality of contacts of said contact block.

4. The IC card processor according to claim 1, wherein said movable member pushes the inserted IC card upward from a lower part to said contact block side to allow a plurality of contacts of said contact block to contact each contact point of said IC card, and
   said elastic member comprises a coil spring which is elastically provided between a spring bracket fixed to a substrate and a projection provided on said contact block.

5. The IC card processor according to claim 1, wherein said movable member pushes the inserted IC card upward from a lower part to said contact block side to allow a plurality of contacts of said contact block to contact each contact point of said IC card, and
   said elastic member comprises a plate spring whose first end side is fixed to a substrate and whose second end side presses against a top end of a projection which is provided upright at a substantially central position on said second surface of said contact block corresponding to the substantial center of said plurality of contacts of said contact block.

6. An IC card processor comprising:
   a card slot defining a space in which an IC card is received;

a contact block having a plurality of contacts on a first surface which respectively contact a plurality of contact points provided on a first surface of the IC card received in said card slot;

a supporting mechanism which movably supports said contact block in a vertical direction with respect to said first surface of the IC card received in said card slot, in a manner such that said contact block is swingable around a first axis line which passes a center of said plurality of contacts of said contact block in an inserting direction of said IC card, and such that said contact block is swingable around a second axis line which passes the center of said plurality of contacts of said contact block in a lateral direction of said IC card; and an elastic member which abuts against said contact block at only one point and which applies a pressing force to press said plurality of contacts of said contact block on said first surface of said IC card, wherein the pressing force is applied by said elastic member to a point which exists on an axis line which passes a cross point of said first axis line and said second axis line and extends vertically;

said IC card processor further comprising:
  a linear rail portion extending from a lower part of one lateral side of said card slot in the inserting direction and supporting one lateral end side of the IC card inserted in said card slot;
  a pair of lateral regulating portions which regulate lateral movement of the IC card inserted in said card slot; and
  a stopper which abuts against a top end of the IC card inserted in said card slot to stop the IC card at a predetermined position;
  wherein said pair of lateral regulating portions comprise a first member positioned at a side opposite to said rail portion in a vicinity of said card slot and a second member positioned at the side opposite to said rail portion in a vicinity of said stopper; and
  wherein a width between the first and second members is larger than a width of said IC card, and a space between said first and second members is opened downward; and said IC card processor further comprising:
  a detection member which detects insertion of said IC card within a positional range between said plurality of contacts and said stopper, and enables transfer of information to/from the IC card when the IC card is inserted to the predetermined position by causing said contact block to be moved toward the inserted IC card so as to bring said plurality of contacts of said contact block into contact with terminals of said IC card; and
  wherein said detection member detects the insertion of said IC card in a space from a rear position of said plurality of contacts of said contact block to the second member of said pair of regulating portions.

7. An IC card processor comprising:

a card slot defining a space in which an IC card is received;

a contact block having a plurality of contacts on a first surface which respectively contact a plurality of contact points provided on a first surface of the IC card received in said card slot;

a supporting mechanism which movably supports said contact block in a vertical direction with respect to said first surface of the IC card received in said card slot, in a manner such that said contact block is swingable around a first axis line which passes a center of said plurality of contacts of said contact block in an inserting direction of said IC card, and such that said contact block is swingable around a second axis line which passes the center of said plurality of contacts of said contact block in a lateral direction of said IC card; and an elastic member which abuts against said contact block at only one point and which applies a pressing force to press said plurality of contacts of said contact block on said first surface of said IC card, wherein the pressing force is applied by said elastic member to a point which exists on an axis line which passes a cross point of said first axis line and said second axis line and extends vertically;

said IC card processor further comprising:
  a linear rail portion extending from a lower part of one lateral side of said card slot in the inserting direction, and supporting one lateral side end of the IC card inserted in said card slot;
  a member forming an escaping portion defined on said rail portion, said member having a height from an upper surface of said rail portion that is larger than two times a thickness of said IC card;
  a stopper which abuts against a top end of the IC card inserted in said card slot to stop the IC card at a predetermined position;
  a supporting portion which is provided in a vicinity of said stopper, and which supports an under surface of the top end of the IC card stopped at said predetermined position; and
  an upward regulating portion which is provided in a vicinity of said contact block, and which regulates upward movement of the IC card;
  wherein a distance between an upper surface of said supporting portion and the under surface of said upward regulating portion is set to be more than a thickness of one piece of the IC card, and less than a thickness of two pieces of said IC card; and
  wherein a space having a height from above the upper surface of the rail portion larger than a thickness of two pieces of the IC card and a width wider than the upper surface of said rail portion is formed on a portion opposite to the upper surface of said rail portion so that the escaping portion is formed for enabling an edge portion of a card body having a thickness of two times the IC card to pass through on the upper surface of said rail portion.

* * * * *